United States Patent
Faraone et al.

(10) Patent No.: US 11,393,324 B1
(45) Date of Patent: Jul. 19, 2022

(54) CLOUD DEVICE AND USER EQUIPMENT DEVICE COLLABORATIVE DECISION-MAKING

(71) Applicant: MOTOROLA SOLUTIONS, INC., Chicago, IL (US)

(72) Inventors: Antonio Faraone, Fort Lauderdale, FL (US); Hyungjae Cho, Northbrook, IL (US); KiYoun Cho, Arlington Heights, IL (US); Charles R. Ruelke, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/171,621

(22) Filed: Feb. 9, 2021

(51) Int. Cl.
| | |
|---|---|
| *G08B 1/08* | (2006.01) |
| *G08B 25/00* | (2006.01) |
| *H04W 4/90* | (2018.01) |
| *H04W 4/029* | (2018.01) |
| *G08B 25/10* | (2006.01) |
| *G08B 25/01* | (2006.01) |
| *G08B 26/00* | (2006.01) |

(52) U.S. Cl.
CPC ......... *G08B 25/007* (2013.01); *G08B 25/012* (2013.01); *G08B 25/016* (2013.01); *G08B 25/10* (2013.01); *G08B 26/003* (2013.01); *H04W 4/029* (2018.02); *H04W 4/90* (2018.02)

(58) Field of Classification Search
CPC ........... G08G 1/168; G06T 7/13; G06T 7/136; G06T 7/60; G06T 11/203; G06V 20/586; H04N 5/272
USPC ..................................................... 340/539.1
See application file for complete search history.

(56) References Cited

U.S. PATENT DOCUMENTS

| | | | |
|---|---|---|---|
| 9,952,856 B2 | 4/2018 | Wetzold et al. | |
| 10,616,042 B2 | 4/2020 | Vyvyan | |
| 2005/0070309 A1* | 3/2005 | Caspi | H04W 4/029 |
| | | | 455/456.5 |
| 2008/0114612 A1* | 5/2008 | Needham | G08B 25/08 |
| | | | 342/357.31 |
| 2014/0219278 A1* | 8/2014 | Bent | H04L 45/34 |
| | | | 370/392 |

(Continued)

FOREIGN PATENT DOCUMENTS

WO     2017117674 A1    7/2017

OTHER PUBLICATIONS

International Search Report and Written Opinion for Application No. PCT/US2022/070070 dated May 3, 2022 (19 pages).

*Primary Examiner* — Tai T Nguyen
(74) *Attorney, Agent, or Firm* — Michael Best & Friedrich LLP

(57) ABSTRACT

One example cloud-based electronic computing device includes and electronic processor and communicates over a wireless communication network with a User Equipment (UE) device. The electronic processor receives public safety incident information about a public safety incident from a public safety command center. The electronic processor receives metadata representing first gathered data from a location of the public safety incident from the UE device. The electronic processor may determine, based on the public safety incident information and the metadata, whether to process the first gathered data by a first UE device at the location of the public safety incident or by the electronic processor of the cloud-based electronic computing device.

20 Claims, 6 Drawing Sheets

(56) References Cited

U.S. PATENT DOCUMENTS

2020/0034205 A1 1/2020 Kelly et al.
2020/0159205 A1 5/2020 Maidment et al.
2020/0351380 A1 5/2020 Fedorov et al.

* cited by examiner

US 11,393,324 B1

CLOUD DEVICE AND USER EQUIPMENT DEVICE COLLABORATIVE DECISION-MAKING

BACKGROUND OF THE INVENTION

User equipment (UE) devices may be configured to store data gathered from their own sensors and/or data received from other UE devices and/or external devices. UE devices may also communicate with a cloud device to, for example, provide data to the cloud device and/or receive data/instructions from the cloud device. In some situations, each of the UE devices and the cloud device may be capable of processing/analyzing data in order to, for example, provide an output to a user or transmit an instruction to another device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
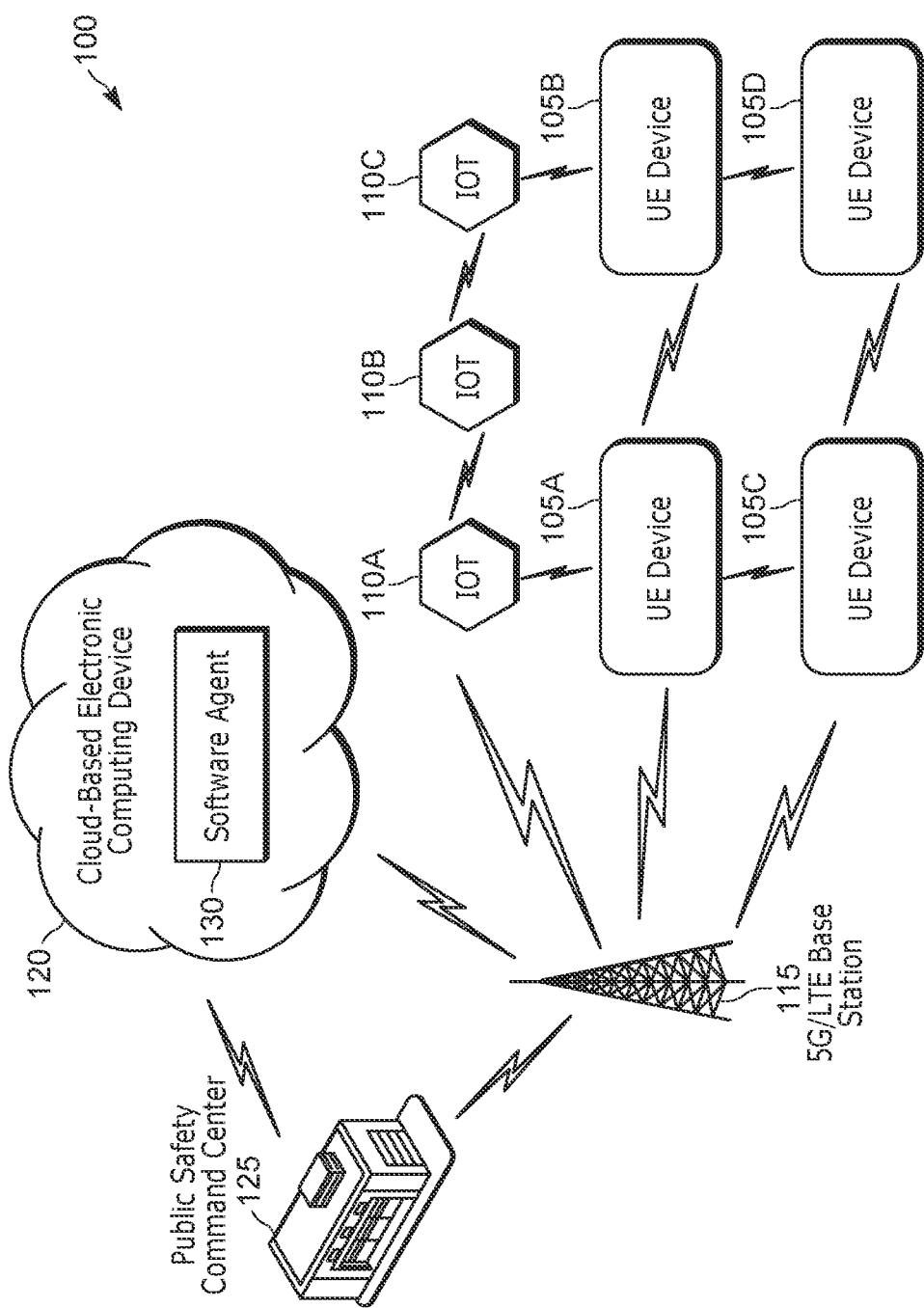
FIG. 1 is a diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted previously herein, in a communication system, both a user equipment (UE) device and a cloud-based electronic computing device (CEC) device may be capable of processing/analyzing data in order to, for example, provide an output to a user of a UE device or transmit an instruction to another device (e.g., another UE device). However, one or more characteristics of a UE device (e.g., its processing capabilities, its power source capabilities, etc.) may be different than corresponding characteristics of the CEC device.

For example, the UE device includes fewer electronic processors or an electronic processor with less processing capability/speed than the CEC device. As another example, the UE device is a portable device powered by a battery pack with a limited battery life while the CEC device is a stationary device powered by a wall outlet connected to a power grid. As yet another example, the UE device may have similar processing capabilities as the CEC device. However, the relative computational cost of performing similar data processing on the UE device compared to the CEC device may be higher for the UE device. Specifically, performing large amounts of data processing/analysis (e.g., video analytics and the like) on the UE device imposes a heavy computational load on the UE device, which may lead to limiting other important functionalities of the UE device. For example, performing large amounts of data analysis on the UE device may quickly discharge the battery pack powering the UE device, thus rendering it inoperable. As another example, performing large amounts of data analysis on the UE device may increase processing times for other actions that the UE device is simultaneously performing such as communicating via text messaging, displaying information downloaded by other applications, encrypting and decrypting digital data, and/or the like.

Additionally, in some situations, the UE device may gather data but may not be aware of other similar data that has been gathered by other devices in the communication system and that has already been processed/analyzed by another device in the communication system. In such situations, the UE device may process its own gathered data only to later find out that such processed data is redundant and did not need to be processed. In this situation, the processing resources of the UE device may have essentially been wasted by discharging the device's battery and burdening processing capabilities (for at least a limited time) of the UE device without producing processed data that is new/useful to the overall communication system, and possibly delaying processing of other queued critical data.

On the other hand, depending on a local context of the UE device, some data processing/analysis may be desirable to perform by the UE device regardless of whether processing of similar data has already occurred by other devices in the communication system or whether the processing could be performed more rigorously or extensively by the CEC device. For example, such local processing of gathered data by the UE device may be desirable when it is useful to provide real-time data analysis in a time-sensitive situation such as environmental monitoring/analysis at an incident scene involving hazardous materials.

Accordingly, there is a technological problem with respect to determining which device(s) in a communication system should perform which types of data processing/analysis at a given time, taking at least partially into account the contexts of the situations where the overall communication system may be presently engaged. This technological problem is particularly apparent when considering public safety communication systems used by public safety personnel responding to a public safety incident. For example, each public safety officer may be assigned a different task across a number of areas at a location of the public safety incident. However, the UE device of each public safety officer may not be aware of the assigned tasks of other officers or of data gathered by the UE devices of other officers and/or by other devices (e.g., Internet-of-Things (IoT) devices) at the location of the public safety incident.

To address this technological problem, disclosed are, among other things, methods, devices, and systems to determine whether to process/analyze gathered data at a UE device or at a CEC device. The determination may be based at least partially on context information about a particular incident of interest as may be received from various data sources. For the purposes of this discussion, context information is any information that "contextualizes" the data, and helps in understanding a data set's relationship to, and importance in setting the priority of, a particular real-world incident of interest. For example, context information may be received from, and categorized by, a plurality of sources, including public safety networks, private networks, personal networks, municipal and state networks, autonomous Internet of Things (IoT) networks, factory networks, etc, each having different domains and uses specific to a particular application, but that may also provide relevant context to other data sets from sources that are not otherwise related to an intended (i.e. primary) use. Access to context information may also be regulated and otherwise controlled by legal governing bodies, that may allow access to confidential materials under "extraordinary circumstances" that would otherwise not be available, such as circumstances posing extreme life-threatening conditions, or other incidences related to public/national security interests. External context information (as opposed to internal device specific sensor "context" information) may be categorized by source, including global public safety contexts, military threat analytics, local public utility management system contexts, private cloud management system contexts, and the like. An example of global public safety incident (GPSI) context information includes data received from a public safety command center, which may also include context information obtained from one or more UE devices and/or IoT devices at the location of the public safety incident (i.e., local public safety incident context information). Based on metadata representing first gathered data and based on at least some of the GPSI context information, the UE device and/or the CEC device is configured to determine whether the UE device or the CEC device should process the first gathered data.

The methods, devices, and systems disclosed herein address the above-noted technological problem by providing collaborative processing/analysis of gathered data between the UE devices and the CEC device in a public safety communication system. Such collaborative processing allows the UE device to perform computational tasks of high priority (e.g., time sensitive tasks) while allowing the CEC device to determine whether the UE device or the CEC device should perform other computational tasks related to other gathered data.

Accordingly, the disclosed collaborative processing allows the UE device to operate more efficiently by often avoiding the exclusive use of internal processing capabilities, and internal power source capabilities, etc. which may be limited due to constrained processing clock speeds and power constraints that impact processing tasks. These UE device limitations may easily have detrimental impact on high priority data processing with respect to the public safety incident. In other words, the disclosed collaborative processing allows the UE device to better preserve battery life and reserve processing capabilities while still providing local processing capabilities with respect to gathered data determined to be a high priority based on the GPSI context information of the public safety incident during which the UE device is being used. Additionally, the use of GPSI context information that was gathered by other devices besides the UE device (i.e., non-local context information) improves the ability of the UE device and the CEC device to determine whether locally gathered data is of a high priority to the public safety incident and should therefore be processed by the UE device that gathered/received the data.

One embodiment provides a cloud-based electronic computing device that may include a network interface configured to communicate over a wireless communication network with at least one of an Internet-of-things (IoT) infrastructure and one or more User Equipment (UE) devices. The cloud-based electronic computing device may also include an electronic processor coupled to the network interface. The electronic processor may be configured to receive, via the network interface, public safety incident information about a public safety incident from a public safety command center. The electronic processor may be further configured to receive, via the network interface, metadata representing first gathered data from a location of the public safety incident from the at least one of the IoT infrastructure and the one or more UE devices. The electronic processor may be further configured to determine, based on the public safety incident information and the metadata, whether to process the first gathered data by a first UE device at the location of the public safety incident or by the electronic processor of the cloud-based electronic computing device. In response to determining that the first gathered data should be processed by the first UE device, the electronic processor may be further configured to send a first instruction to the first UE device to process the first gathered data. Processing the first gathered data by the first UE device may result in the first UE device performing an action. In response to determining that the first gathered data should be processed by the electronic processor of the cloud-based electronic computing device, the electronic processor may be further configured to send a second instruction to the at least one of the IoT infrastructure and the one or more UE devices to transmit the first gathered data to the cloud-based electronic computing device. The electronic processor may be further configured to receive, via the network interface, the first gathered data from the at least one of the IoT infrastructure and the one or more UE devices. The electronic processor may be further configured to process the first gathered data to add information to the public safety incident information or update information included in the public safety incident information to generate global public safety incident context information.

Another embodiment provides a method for determining whether to process data at a first User Equipment (UE) device or at a cloud-based electronic computing device. The method may include receiving, with an electronic processor of the cloud-based electronic computing device and via a network interface of the cloud-based electronic computing device, public safety incident information about a public safety incident from a public safety command center. The method may further include receiving, with the electronic processor and via the network interface, metadata representing first gathered data from a location of the public safety incident from the at least one of an IoT infrastructure and one or more UE devices. The method may further include determining, with the electronic processor and based on the public safety incident information and the metadata, whether to process the first gathered data by a first UE device at the location of the public safety incident or by the electronic processor of the cloud-based electronic computing device. In response to determining that the first gathered data should be processed by the first UE device, the method may further include sending, with the electronic processor and via the network interface, a first instruction to the first UE device to process the first gathered data. Processing the first gathered data by the first UE device may result in the first UE device performing an action. In response to determining that the first gathered data should be processed by the electronic processor of the cloud-based electronic computing device, the method may further include sending, with the electronic processor and via the network interface, a second instruction to the at least one of the IoT infrastructure and the one or more UE devices to transmit the first gathered data to the cloud-based electronic computing device. The method may further include receiving, with the electronic processor and via the network interface, the first gathered data from the at least one of the IoT infrastructure and the one or more UE devices. The method may further include processing, with the electronic processor, the first gathered data to add information to the public safety incident information or update information included in the public safety incident information to generate global public safety incident context information.

Another embodiment provides a first User Equipment (UE) device that may include an output device configured to provide an output to a user, an input device configured to capture data, and a network interface configured to communicate over a wireless communication network with at least one of a cloud-based electronic computing device, an Internet-of-things (IoT) infrastructure, and one or more other UE devices. The first UE device may also include an electronic processor coupled to the output device, the input device, and to the network interface. The electronic processor may be configured to receive, via the network interface, public safety incident information about a public safety incident from a public safety command center. The electronic processor may be further configured to receive, from at least one of a group consisting of (i) the input device, (ii) the IoT infrastructure, and (iii) the one or more other UE devices, first gathered data from a location of the public safety incident. The electronic processor may be further configured to generate metadata representing the first gathered data. The electronic processor may be further configured to determine, based on the public safety incident information and the metadata, whether to process the first gathered data by the electronic processor of the first UE device. In response to determining that the first gathered data should be processed by the electronic processor of the first UE device, the electronic processor may be further configured to process the first gathered data to at least one of a group consisting of (i) provide the output with the output device and (ii) transmit data, via the network interface to one or more of the at least one of the IoT infrastructure and the one or more other UE devices. In response to determining that the first gathered data should not be processed by the electronic processor of the first UE device, the electronic processor may be further configured to transmit, via the network interface, at least one of a group consisting of the metadata and the first gathered data to the cloud-based electronic computing device.

For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

FIG. 1 is a diagram of a communication system 100 according to one example embodiment. In the example illustrated, the communication system 100 includes User Equipment (UE) devices 105A through 105D. The communication system 100 may also include Internet-of-Things (IoT) devices 110A through 110C. In the following description, when explaining how a single UE device 105 functions and how a single IoT device 110 functions, a reference to UE device 105 and IoT device 110 is respectively used. It is not necessary, however, that the UE devices 105A through 105D are identical or that the IoT devices 110A through 110C are identical. The UE devices 105A through 105D and the IoT devices 110A through 110C are merely examples. In some embodiments, the communication system 100 may include more or fewer UE devices 105 and IoT devices 110 than illustrated in FIG. 1. One or more IoT devices 110 at a similar general location (e.g., within a building) may be referred to as an IoT infrastructure. The IoT devices 110 that make up the IoT infrastructure may be configured to communicate with each other and with other nearby devices (e.g., UE devices) within communication range of the IoT devices 110 as explained herein.

In some embodiments, the devices 105 and 110 are located at a scene/location of a public safety incident. In some embodiments, a public safety incident is an event, occurrence, or situation affecting or potentially affecting the safety of one or more citizens that one or more public safety officers (for example, firefighters, police officers, paramedics, and the like) are tasked with protecting. The public safety incident may be an incident in which public safety officers/personnel engage in to protect public interests and keep the public safe (for example, a building fire, a criminal pursuit or other law enforcement event, a natural disaster, a medical incident, a traffic accident, a public safety disturbance, and the like).

In some embodiments, the UE device 105 is a handheld communication device, for example, a mobile telephone or other portable communication device, mobile vehicular radio, laptop computer, tablet computer, smart watch or other smart wearable, and may be located in or be a part of a drone or unmanned aerial vehicle, or may be another device configured to communicate with other devices included in the communication system 100. In some embodiments, the UE device 105 is a handheld radio carried by a public safety officer or first responder, such as a police officer. In some embodiments, the UE device 105 is a mobile communication device mounted in or on a vehicle (for example, a police vehicle, an ambulance, or the like).

In some embodiments, the IoT device 110 is a stationary or portable device configured to perform a task such as gathering data and/or providing an output to a user. The IoT device 110 may be located in a location that is proximate to a public safety incident scene. For example, in some cases the IoT device 110 is a security camera, a smoke detector, a carbon monoxide detector, a fire alarm or other type of alarm system, and/or the like located in a building. When a fire occurs in the building, the building may be considered a public safety incident scene/location. In some other cases, for example, the IoT device 110 is a personal area communication device such as a body-worn camera, a body-worn microphone, a smartphone, and the like.

As illustrated in FIG. 1, the communication system 100 may also include a public safety command center 125 and a CEC device 120. In some embodiments, the public safety command center 125 includes one or more UE devices 105 (for example, one or more desktop computers that act as dispatch consoles). When describing the public safety command center 125 as communicating with other devices in the system 100 herein, it should be understood that one or more UE devices 105 located/maintained at the command center 125 are performing such communication.

In some embodiments, the CEC device 120 includes one or more electronic processors located at the same location or at distributed locations. For example, the CEC device 120 may include one or more servers that provide computational resources to the devices 105 and 110 of the communication system 100. The CEC device 120 may include a cloud-based software agent 130 configured to execute at least some of the methods described herein. In some embodiments, the cloud-based software agent 130 is a software application that controls other integrated or separate cloud-based processing devices to perform certain tasks. For example, the cloud-based software agent 130 processes an image (i.e., image/video) analytics processing device to analyze image (i.e. image/video) data, for example, that is gathered from the devices 105 and/or 110. One or more elements of the CEC device 120 may be implemented as a discrete network element on a dedicated hardware, as a software instance running on dedicated hardware, or as a virtualized function instantiated on an appropriate platform, e.g., dedicated hardware or a cloud-based computing infrastructure.

In some embodiments, public safety incident information is generated and is stored by one or more UE devices 105 at the command center 125 and/or in one or more memories of the CEC device 120. For example, such public safety information may be generated at the command center 125 automatically by an electronic processor (e.g., of a UE device 105 acting as a dispatch console) monitoring calls received by the command center 125. For example, the electronic processor may retrieve metadata associated with retrieved calls (e.g., location of call, caller identification of caller, etc.). As another example, the electronic processor may perform natural language processing of audio during a call. Public safety incident information may also be generated manually at the command center 125, for example, by a dispatcher or an emergency call handler entering data received during a call into a UE device 105 (e.g., a dispatch console) located at the command center 125.

In some embodiments, the command center 125 and/or the CEC device 120 stores context information regarding numerous sub-scenes at a public safety incident as well as context information of numerous UE devices 105 and the corresponding public safety personnel associated with each UE device 105. For example, the command center 125 and/or the CEC device 120 may be aware of the locations of each UE device 105 at the public safety incident, the capabilities of each UE device 105 at the public safety incident, and an intended task to be performed by each public safety officer at the public safety incident. When the context information of one UE device or public safety officer is stored at the command center 125 and/or the CEC device 120, such context information may be referred to as global public safety incident (GPSI) context information and is saved with other context information about the public safety incident (e.g., context information about other UE devices 105 or public safety officers or context information about the public safety incident in general). GPSI context information may also include context information gathered from other locations/scenes that may be related to the public safety incident, such as for example scenes in other locations where respective public safety disturbances events are concurrently happening and therefore are likely to have been coordinated. In some embodiments, GPSI context information is accessible by any device 105, 110 that is configured to communicate with the command center 125 and/or the CEC device 120 where the GPSI context information is stored.

Due to limited memory of the UE devices 105, each UE device 105 may not store all of the GPSI context information locally in the memory of the UE device 105. However, each UE device 105 may store some local context information, for example, that is gathered locally by input devices/sensors of the UE device 105. For example, such public safety incident context information may include a location of the UE device 105 as determined by a global positioning system (GPS) receiver or equivalent means, environmental data sensed by environmental sensors of the UE device 105 or by nearby IoT devices 110 communicatively coupled with the UE device 105, stored data regarding one or more assigned tasks of the user of the UE device 105 with respect to the public safety incident, and/or the like. In some embodiments, local context information also includes data inputted by a user of the UE device 105 (e.g., a man-down indication reported by the user, a request for backup input by the user, etc.). Additionally, the UE device 105 may receive some GPSI context information from the command center 125 and/or the CEC device 120. Any context information stored locally by the UE device 105 may be referred to as local public safety incident (LPSI) context information because it is saved and updated locally on the memory of the UE device 105. In other words, the LPSI context information is locally accessible by the electronic processor of the UE device 105 without communicating with a remotely located entity/device such as the command center 125 or the CEC device 120. However, as noted above, the LPSI context information for each UE device 105 may be limited due to memory, processing, and/or communication limitations of the UE devices 105.

As explained with respect to GPSI context information and LPSI context information, some public safety incident context information may be accurately referred to as both global and local if such information is stored and accessible globally at the command center 125 and/or the CEC device 120 and if such information is also stored in a memory of a first UE device 105. However, for any UE devices 105 that are not storing such information, such information would only be considered GPSI context information. Accordingly, in some embodiments, whether public safety incident context information is global and/or local depends on the perspective of each UE device 105.

As illustrated in FIG. 1, the command center 125, the CEC device 120, and at least some of the UE devices 105 and the IoT devices 110 may be configured to communicate with each other over a 5G/LTE network via a 5G/LTE base station 115 (for example, by sending and receiving radio signals to and from the base station 115). Although only one base station 115 is shown in FIG. 1, in other embodiments, the communication system 100 may include additional base stations 115. In some embodiments, the 5G/LTE communication network includes the 5G/LTE base station(s) 115, the command center 125, the CEC device 120, the UE devices 105 configured to communicate via the base station 115, and the IoT devices 110 configured to communicate via the base station 115. In some embodiments, components of the 5G/LTE communication network such as the 5G/LTE base station(s) 115, the command center 125, the CEC device 120, etc. may be interconnected to each other directly, or through repeater stations, using either a terrestrial based switched-packet data communication system (i.e., internet), or a RF wireless communication protocol of sufficient data bandwidth to facilitate proper operations, or some combination of RF wireless and terrestrial based linkage as may be appropriate. In some embodiments, the 5G/LTE communication network incorporates a cloud-based software agent 130 that may be capable of communicating data such as streaming, downloading, and uploading audio data, image data (i.e., image/video), voice data, text data, and/or the like between the entities/devices 105, 110, 115, 120, and 125 shown in FIG. 1. The UE devices 105 may also be referred to as edge devices because they provide an entry point to the 5G/LTE communication network.

In an example embodiment, the communication network is a 5G/LTE communication network that includes a cloud-based software agent 130. However, other communication networks may also be used. The communication network may include wireless and wired portions. All or parts of the communication network may be implemented using various existing or future-developed specifications or protocols. In some embodiments, the communication network is implemented using a direct-mode, conventional, or trunked land mobile radio (LMR) standard or protocol, for example, a Digital Mobile Radio (DMR) standard defined by the European Telecommunications Standards Institute (ETSI), a Project 25 (P25) standard defined by the Association of Public Safety Communications Officials International (APCO), a Terrestrial Trunked Radio (TETRA) standard defined by the European Telecommunications Standards Institute (ETSI), or other LMR radio protocols or standards. In some embodiments, the communication network implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The communication network may also include future developed networks. In some embodiments, the communication network may also include a combination of the networks mentioned.

In some embodiments, the UE devices 105 and the IoT devices 110 may be configured to communicate directly with each other using a communication channel or connection that is outside of the 5G/LTE communication network (i.e., the communication does not occur via the base station 115). For example, as indicated by the lightning bolts in FIG. 1, at least some of the UE devices 105 and the IoT devices 110 may communicate directly with each other when they are within a predetermined distance from each other using short-range communication mechanisms such as Bluetooth® communication links. In some embodiments, one or more IoT devices 110 may not be configured to communicate directly over the 5G/LTE network. Rather, the IoT device 110 (e.g., IoT device 110B or 110C) may be configured to directly communicate with a nearby IoT device 110 or UE device 105, which in turn is configured to communicate over the 5G/LTE network, for example, to relay information received "at the edge" from the IoT device 110B or 110C to other devices of the communication system 100 via direct device-to-device communication and/or via communication over the 5G/LTE network.

FIG. 1 illustrates only one example embodiment of the communication system 100. In other embodiments, the system 100 may include more or fewer components and may perform functions that are not explicitly described herein. For example, the communication system 100 may include additional UE devices 105, IoT devices 110, base stations 115, and command centers 125. As another example, while shown as a single entity in FIG. 1, the CEC device 120 may include numerous separate cloud-based components as described previously herein. The lightning bolts in FIG. 1 represent communication capability between devices shown in FIG. 1. Such communication may occur wirelessly in some situations and may occur over wired connections between the devices in other situations. For example, the communication link between the command center 125 and the CEC device 120 may be a landline connection.

Figure 2:
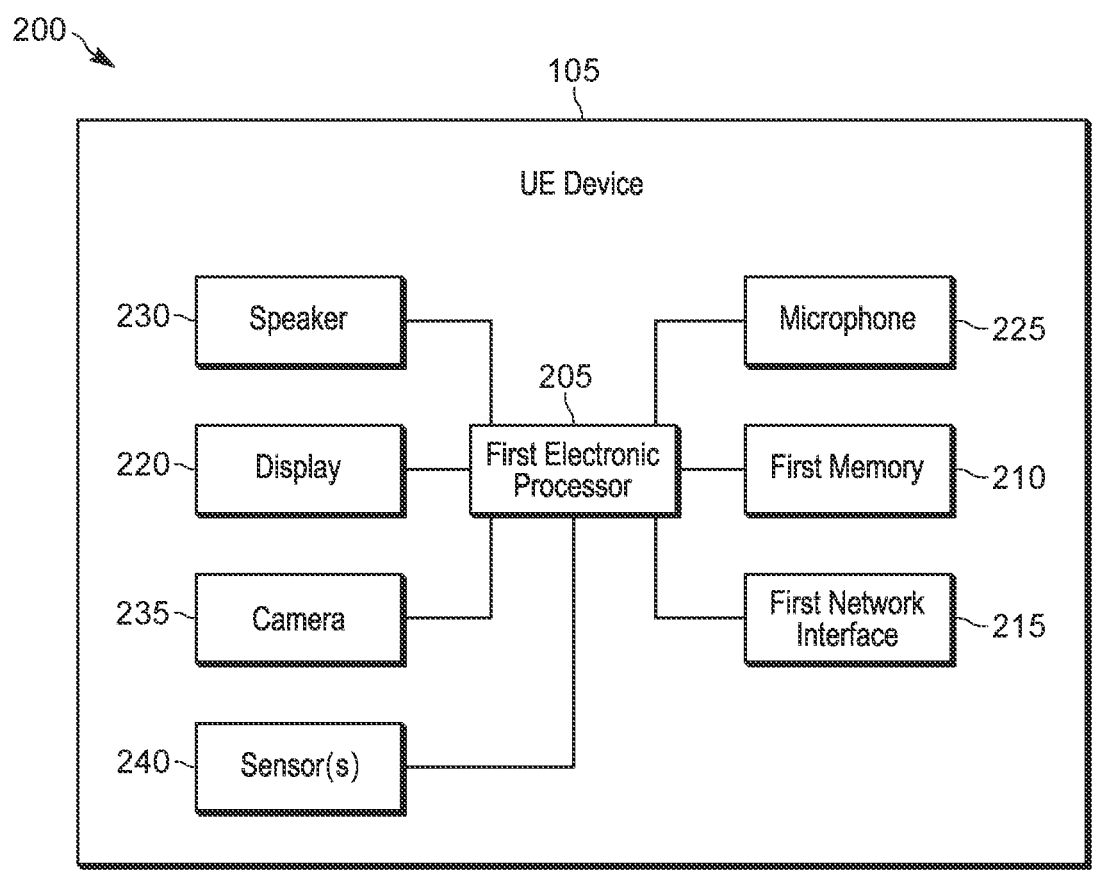
FIG. 2 is a block diagram of a User Equipment (UE) device included in the communication system of FIG. 1 according to one example embodiment.

FIG. 2 is a block diagram 200 of a UE device 105 of the communication system 100 according to one example embodiment. In the example shown, the UE device 105 includes a first electronic processor 205 (for example, a microprocessor or another electronic device). The first electronic processor 205 may include input and output interfaces (not shown) and be electrically connected to a first memory 210, a first network interface 215 including a transceiver and an antenna, a display 220, a microphone 225, a speaker 230, a camera 235, and sensors 240.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform at least some of the methods described herein.

The first network interface 215 may send and receive data to and from other devices in the communication system 100 (for example, directly and/or over the communication network described previously herein). For example, the first network interface 215 includes a wireless Radio Frequency (RF) communication transceiver and an antenna, for example a RF antenna, for wirelessly communicating with other devices. Alternatively or in addition, the first network interface 215 may include a connector or port for receiving a wired connection to one or more communication networks, such as an Ethernet cable. The first electronic processor 205 receives electrical signals representing sound from the microphone 225 and receives electrical signals representing image data (which may include image data and/or video data) from the camera 235. The first electronic processor 205 may communicate information relating to these electrical signals to other devices through the first network interface 215 (for example, to another UE device 105 or to the CEC device 120). Similarly, the first electronic processor 205 may output data received via the first network interface 215 (for example, audio data and/or image data from another UE device 105, from an IoT device 110, from the CEC device 120, and/or from the command center 125) using the speaker 230, the display 220 (which may include a touchscreen), or a combination thereof. In some embodiments, a user interface of the UE device 105 may include one or more output devices that provide output to a user (e.g., the display 220, the speaker 230, etc.) and one or more input devices that receive input from the user (e.g., the microphone 225, the display 220 embodied as a touchscreen, etc.).

In some embodiments, the UE device 105 may include fewer or additional components in configurations different from that illustrated in FIG. 2. For example, in some embodiments, the UE device 105 also includes one or more of a location component (for example, a global positioning system (GPS) receiver), a push-to-talk (PTT) mechanism/button, and one or more additional data gathering devices/sensors 240 (e.g., similar to data gathering device 320 explained below with respect to FIG. 3). In some embodiments, data gathering devices such as the microphone 225, the camera 235, and the sensors 240 may also be referred to as input devices that are configured to capture data (e.g. locally within the surroundings of the UE device 105). As another example, the UE device 105 may not include the camera 235. In some embodiments, the UE device 105 performs at least one additional functionality than the functionality described herein.

In some embodiments, the first network interface 215 may be configured to communicate over one or more different wireless communication networks or using different wireless communication protocols. For example, the network interface 215 may include multiple RF transceivers and/or multiple RF antennas to allow for communication over different types of wireless communication networks/protocols. In some embodiments, the network interface 215 includes multiple RF transceivers to allow for communication over different types of wireless communication networks/protocols but each transceiver may be configured to use the same RF antenna to engage in such communications. In some embodiments, a single RF transceiver may be configured to allow for communication over different types of wireless communication networks/protocols. In some embodiments, the network interface 215 is configured to directly communicate with nearby devices 105, 110 using a first communication protocol (e.g., Bluetooth®) that is outside of the 5G/LTE communication network. The network interface 215 may also be configured to communicate with the same or different devices 105, 110 as well as other devices 105, 110, 120, 125 using a second communication protocol over the 5G/LTE communication network.

Figure 3:
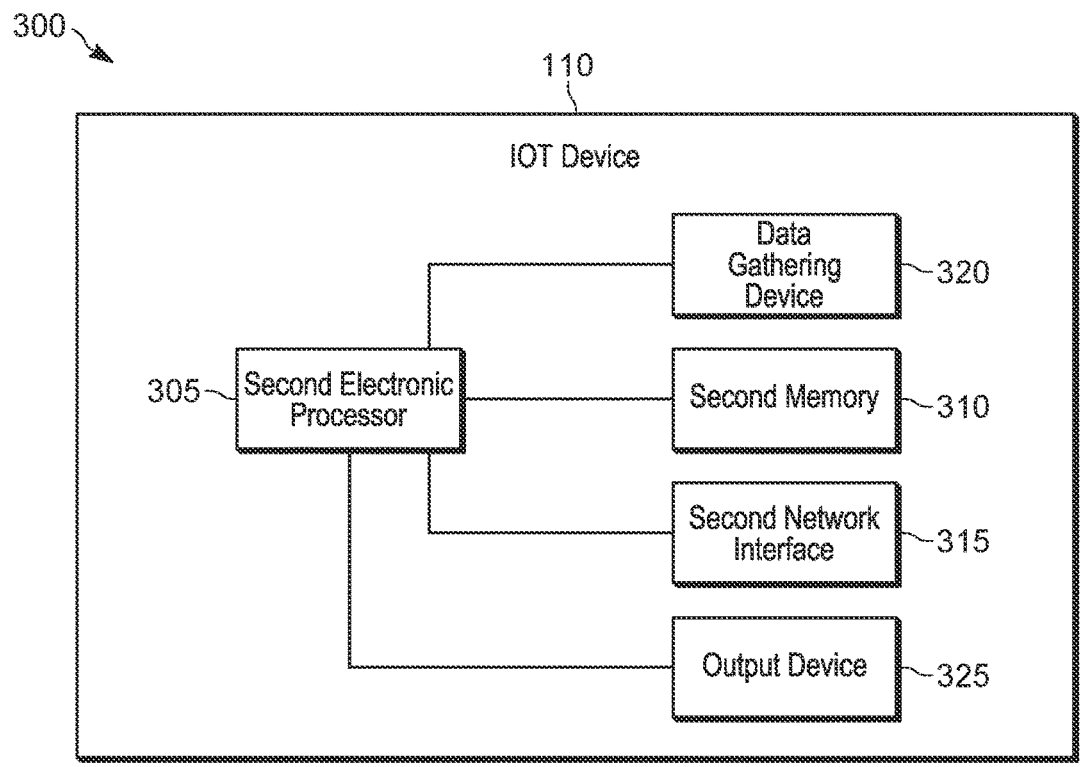
FIG. 3 is a block diagram of a Internet-of-Things (IoT) device included in the communication system of FIG. 1 according to one example embodiment.

FIG. 3 is a block diagram 300 of an IoT device 110 according to one example embodiment. In the example illustrated, the IoT device 110 includes a second electronic processor 305, an optional input/output interface (not shown), a second memory 310, a second network interface 315 (for example, including a transceiver and an antenna), one or more data gathering devices 320, and optionally one or more output devices 325. The components shown in FIG. 3 are similar to the like-named components described above with respect to the UE device 105 and perform similar general functions. Accordingly, in some embodiments, the IoT devices 110 may include at least some similar components and functionality (e.g., data gathering capabilities and data communication capabilities) as the UE devices 105. In some embodiments, the network interface 315 is configured to directly communicate with nearby devices 105, 110 using the first communication protocol (e.g., Bluetooth®) that is outside of the 5G/LTE communication network and may not be configured to communicate using the second communication protocol over the 5G/LTE communication network.

In some embodiments, the data gathering device 320 includes a camera (e.g., a thermal camera, an infrared camera, a night vision camera, and/or the like), an air quality sensor (e.g., a smoke detector, a carbon monoxide detector, or the like), a microphone, a moisture sensor, a temperature sensor, and/or any other sensor/device configured to gather data with respect to the surroundings of the IoT device 110.

In some embodiments, the output device 325 includes a speaker, a buzzer, a light emitting diode (LED) or other light, and/or any other alarm or device configured to provide an output that may be recognized by a nearby person such as a public safety officer or a member of the general public.

In some embodiments, the IoT device 110 may include fewer or additional components in configurations different from that illustrated in FIG. 3. For example, in some embodiments, the IoT device 110 also includes a location component (for example, a GPS receiver), and/or a proximity sensor. As another example, some IoT devices 110 may not include one of the data gathering device 320 or the output device 325. Rather, some IoT devices 110 may perform a single function of gathering data with the data gathering device 320 and transmitting gathered data to other devices in the communication system 100, for example by continuously streaming video footage through the second network interface 315. Similarly, some other IoT devices 110 may perform a single function of receiving instructions from other devices in the communication system 100 and providing an output via the output device 325 in response to receiving the instruction. In some embodiments, the IoT device 110 performs at least one additional functionality than the functionality described herein.

Figure 4:
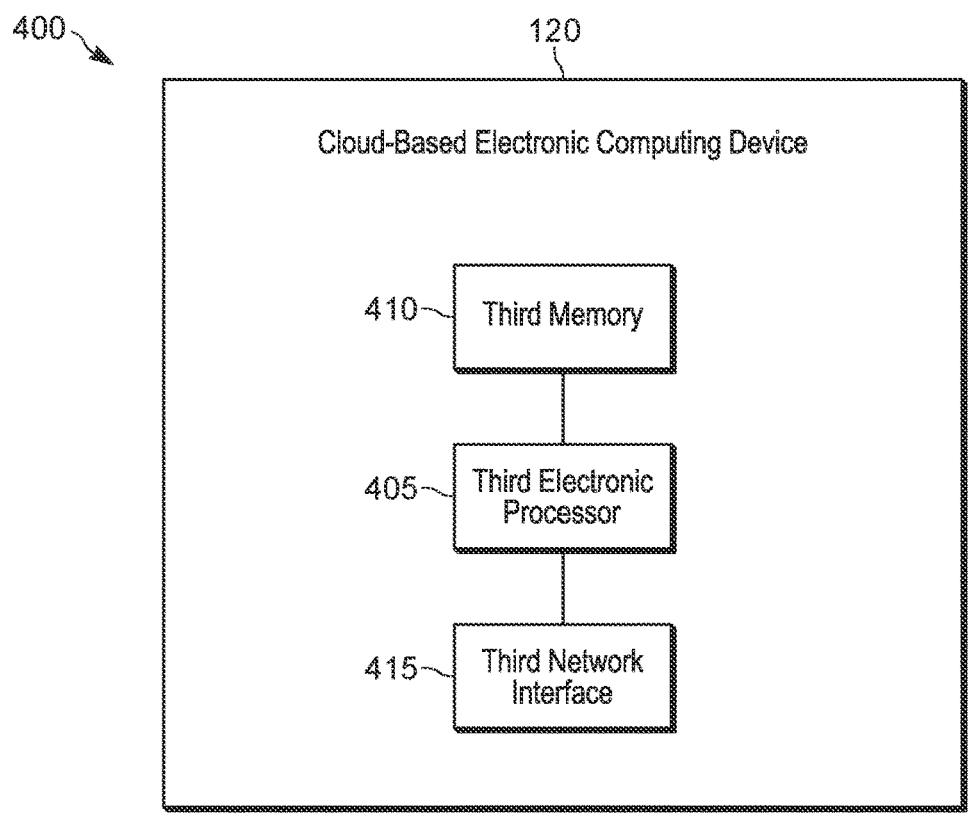
FIG. 4 is a block diagram of a cloud-based electronic computing (CEC) device included in the communication system of FIG. 1 according to one example embodiment.

FIG. 4 is a block diagram 400 of the CEC device 120 according to one example embodiment. The cloud-based software agent 130 operations may be primarily performed on the electronic computing device 120, although parallel processes that augments the software agent 130 tasks may be running on different physical and/or virtual platforms. In the example illustrated, the CEC device 120 includes one or more computers that include a third electronic processor 405, an optional input/output interface (not shown), a third memory 410, and a third network interface 415 (for example, including an RF transceiver and an RF antenna). These components are similar to those described above with respect to the UE device 105 and perform similar general functions. The CEC device 120 may include a physical device and/or a virtual device, such as one or more servers. In various examples, the CEC device 120 may be a specialized computer or any machine capable of executing instructions (sequential or otherwise) that specify actions to be taken by that machine. In some embodiments, the functionality of the third electronic processor 405 is implemented by one or more electronic processors located at the same or different locations. In other words, while FIG. 4 shows a single third electronic processor 405, the third electronic processor 405 may be representative of electronic processors of multiple distributed cloud devices (e.g., an image analytics processing device configured to analyze image data). In some embodiments, the third electronic processor 405 implements the cloud-based software agent 130 mentioned previously herein that is configured to execute at least some of the methods described herein.

In some embodiments, the CEC device 120 may include fewer or additional components in configurations different from that illustrated in FIG. 4. In some embodiments, the CEC device 120 performs at least an additional functionality than the functionality described herein.

In some embodiments, the CEC device 120 communicates with other devices of the communication system 100 to receive, store, and process/analyze information (e.g., gathered data) and to control and/or influence operation of other devices 105, 110 as explained in greater detail below.

As explained previously herein, there is a technological problem with respect to determining which device(s) in a communication system should perform which types of data processing/analysis at a given time. This technological problem is particularly apparent when considering public safety communication systems used by public safety personnel responding to a public safety incident. For example, each public safety officer may be assigned a different task across a number of areas at a location of the public safety incident. However, a first UE device 105 of a first public safety officer may not be aware of the assigned tasks of other officers or of data gathered by other UE devices 105 of other officers and/or by IoT devices 110 outside the communication range of the first UE device 105 at the location of the public safety incident. In other words, the first UE device 105 may only have access to LPSI context information rather than the GPSI context information stored by, for example, the CEC device 120.

Figure 5:
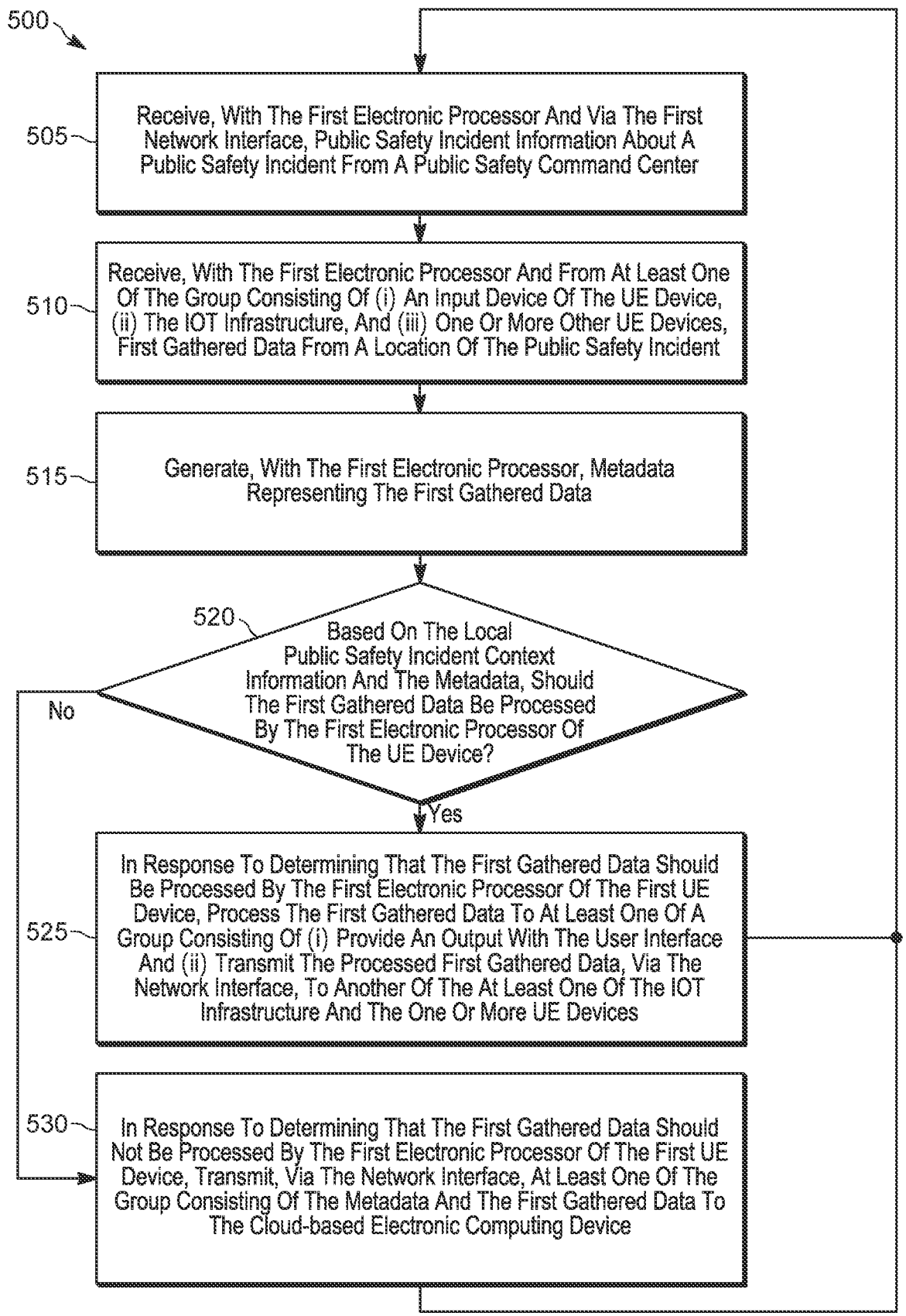
FIG. 5 is a flowchart of a method of determining whether to process data gathered by a first UE device at the first UE device or at the CEC device according to one example embodiment.
Figure 6:
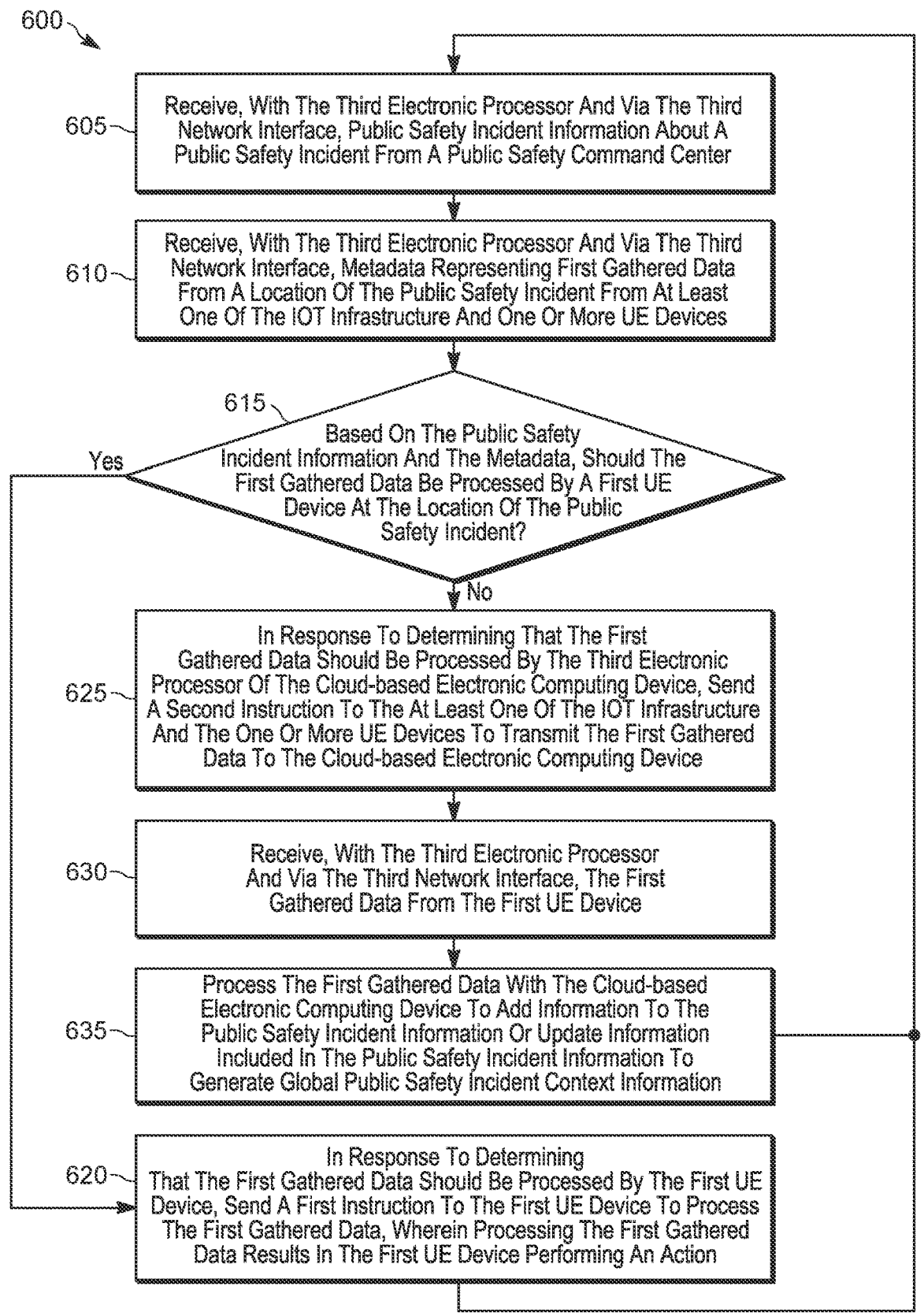
FIG. 6 is a flowchart of a method of determining whether to process data gathered by the first UE device at the first UE device or at the CEC device according to one example embodiment.
Figure 7:
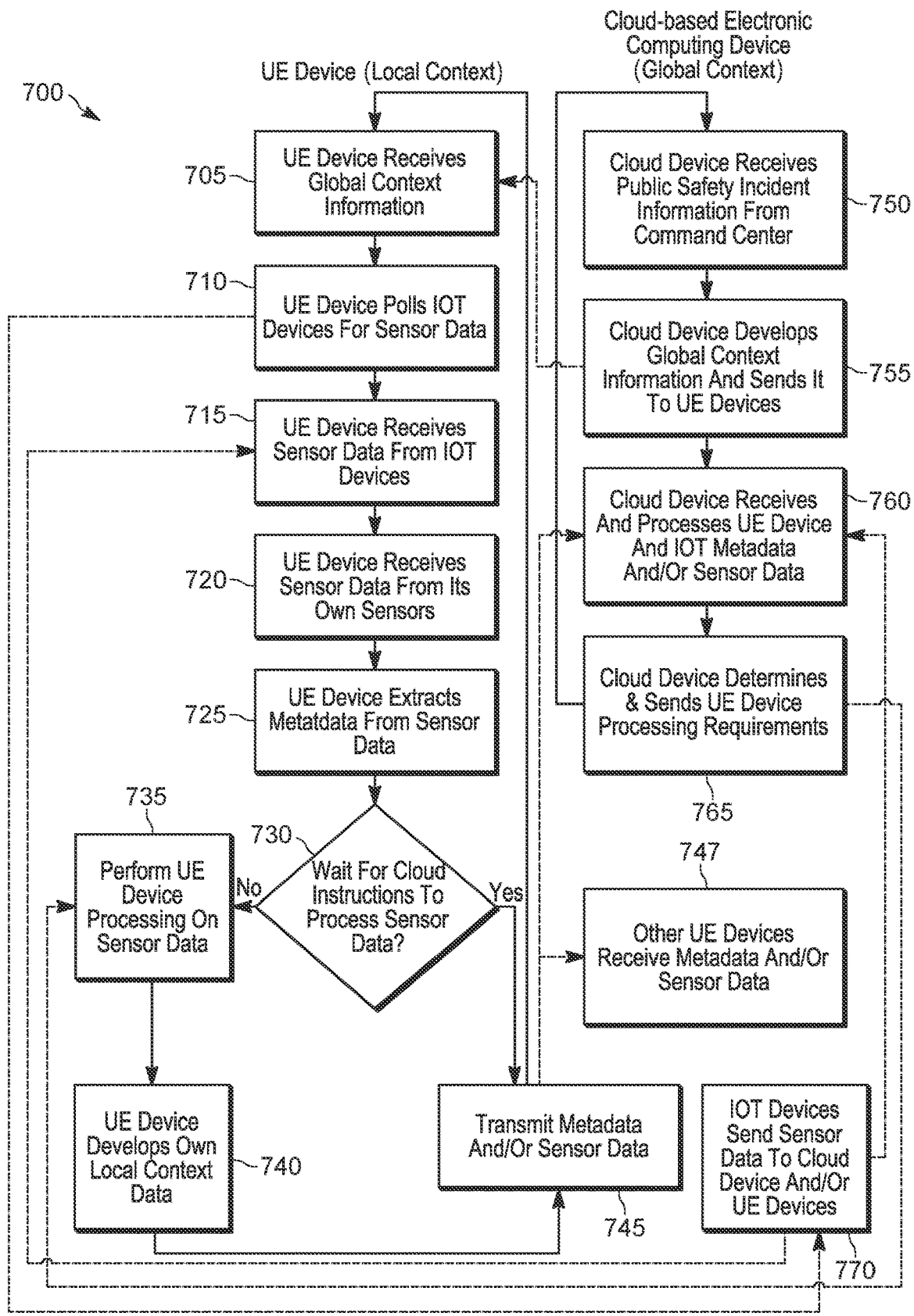
FIG. 7 illustrates a flow diagram that shows various general steps taken by one or more UE devices and the CEC device during performance of the methods of FIGS. 5 and 6 according to one example embodiment.

To address this technological problem, one or more devices of the communication system 100 may perform the methods explained below to determine whether to process gathered data at the first UE device 105 or at the CEC device 120. FIGS. 5-6 are flowcharts of methods for determining whether to process gathered data at the first UE device 105 or at the CEC device 120. The general processes performed throughout each of the methods shown in FIGS. 5-6 are included in the system flow diagram 700 of FIG. 7. While a particular order of processing steps, message receptions, and/or message transmissions is indicated in FIGS. 5-7 as an example, timing and ordering of such steps, receptions, and transmissions may vary where appropriate without negating the purpose and advantages of the examples set forth in detail throughout the remainder of this disclosure. As just one example, block 505 may be executed after blocks 510 and 515 in some situations or in some embodiments.

FIG. 5 is a flowchart of a method 500 of determining whether to process data gathered by the first UE device 105 (or by another device such as an IoT device 110) at the first UE device 105 or at the CEC device 120 according to one example embodiment. In some embodiments, the method 500 is performed by the first UE device 105, and, specifically, the first electronic processor 205. The method 500 sequencing by processor 205 may be executed in conjunction with a related method 600 of FIG. 6 that is executed by the CEC device 120 to further determine how to process data gathered by the first UE device 105 (or by another device such as an IoT device 110). In other words, the method 500 is explained from the perspective of the first UE device 105 while the method 600 is explained from the perspective of the CEC device 120.

An instance of the method 500 begins at block 505, where the first electronic processor 205 receives, via the first network interface 215, public safety incident information about a public safety incident from the public safety command center 125. In some situations, the public safety incident information is received directly from the command center 125 via the 5G/LTE network. In other situations, the public safety incident information is received from the CEC device 120, which is configured to store information received from the command center 125. In fact, in some embodiments, at least some portions of the CEC device 120 may be located at the command center 125.

In some embodiments, the public safety incident information received by the first UE 105 is a portion of GPSI context information as explained previously herein. Such information may include a type of public safety incident for which the user of the first UE device 105 has been assigned (e.g., a fire, a gas leak, a bank robbery, a natural disaster, a traffic accident, a public safety disturbance, or the like). As another example, the public safety incident information may provide a building map/blueprint if the public safety incident involves a building (e.g., a building fire). As yet another example, the public safety incident information may indicate one or more IoT devices 110 expected to be located at the location of the incident (e.g., security cameras and smoke detectors in a building), as well as ancillary information, for example, authentication keys (e.g. passwords, scrambling keys, etc.) to enable secure connection with the IoT devices 110. Other types of public safety incident information also may be received by the first UE device 105.

Upon receiving the public safety incident information from remote entities/devices 120, 125, the first electronic processor 205 stores the public safety incident information in the first memory 210. As explained previously herein, upon being stored in the first memory 210 for local use by the first electronic processor 205, the received public safety incident information may be referred to as LPSI context information with respect to the first UE device 105. Also as explained previously herein, this LPSI context information is only a portion of the GPSI context information stored by the CEC device 120 with respect to all UE devices 105 associated with the public safety incident and with respect to the public safety incident in general. Furthermore, the LPSI context information may be updated locally at the UE device 105 on the basis of data acquired by the UE device 105, for example based on user inputs and/or readings from the sensor 240. Consequently, at some point in time, the updated LPSI context information may include information that is outside of (i.e., not included in) the GPSI context information. This updated LPSI context information may enable the first electronic processor 205 of the UE device 105 to make determinations based on its exclusive knowledge of the updated LPSI context information. For example, based on the updated LPSI context information, the first electronic processor 205 may determine to override instructions received from the software agent 130.

At block 510, the first electronic processor 205 receives, from at least one of the group consisting of (i) one of its own input devices (e.g., the microphone 225, the camera 235, or another data gathering device), (ii) the IoT infrastructure (i.e., one or more IoT devices 110), and (iii) one or more other UE devices 105, first gathered data from a location of the public safety incident. In other words, the first gathered data may be gathered by an input device of the first UE device 105 itself or may be gathered by another device 105, 110 and received, for example, via wireless communication, by the first UE device 105. The first gathered data may include any type of data detectable by an input device/sensor (e.g., audio data, image data (which includes video data), air quality data, temperature data, and/or the like). At the time the first gathered data is gathered, it may be assumed that the device 105, 110 gathering the data is located within a perimeter of the public safety incident. In some embodiments, this assumption may be verified by the first electronic processor 205 by comparing a determined location of the first UE device 105 with a known or received location of the public safety incident, or with "geotag" data fields embedded within the first gathered data.

At block 515, the first electronic processor 205 generates metadata representing the first gathered data. The metadata may be any subset/summary of the first gathered data that can be extracted from the first gathered data with a small amount of processing. In other words, the metadata provides information about the first gathered data without performing detailed analysis/processing (e.g., without performing detailed image analysis of image data such as shape recognition or detailed identification of patterns/trends in other data) of the entirety of the first gathered data. For example, the metadata may merely indicate a type of the first gathered data (i.e., a type of input device/sensor that was used to capture the first gathered data). As other examples, the metadata may indicate a size of a file including the first gathered data and/or an image resolution of the first gathered data when the first gathered data is image data. The metadata may indicate whether first gathered video data includes audio data along with the video data. Continuing the example where the first gathered data is video data, the metadata may include one video frame for every second of the video data (e.g., a summary of the video data) instead of all of the frames that make up the entirety of the first gathered video data.

At block 520, the first electronic processor 205 determines, based on the LPSI context information and the metadata, whether to process the first gathered data by the first electronic processor 205 of the first UE device 105. In other words, the first electronic processor 205 determines whether the first gathered data should be immediately processed/analyzed by the first electronic processor 205 (e.g., rather than sending the metadata to the CEC device 120 and waiting for instructions from the CEC device 120 as to whether to locally process the first gathered data or to transmit the first gathered data to the CEC device 120 to be processed).

In some embodiments, the first electronic processor 205 is configured to determine that the first gathered data should be processed by the first electronic processor 205 in response to determining that the metadata indicates that the first gathered data includes high priority information with respect to the public safety incident based on at least one of a type of the public safety incident (e.g., a fire, a hostage situation, a gas leak, a bank robbery, or the like), the location of the public safety incident (e.g., proximity to a hospital or other buildings, proximity to other nearby incidents, frequency of previous incidents as the same location, or the like), and an environment of the public safety incident (e.g., indoor versus outdoor, high visibility/well-lit versus low visibility/dark, weather at the location of the incident, or the like). In some embodiments, processing of first gathered data that is likely to result in processed data that provides a time-sensitive notification (e.g., a notification to the operator of the UE device 105) is performed immediately by the first electronic processor 205 of the first UE device 105 while processing of first gathered data that is likely to result in processed data of lower priority (e.g., medium priority or low priority) is not performed immediately by the first electronic processor 205. The determination of whether processing the first gathered data is a high priority computational task (i.e., likely to result in processed data that provides a time-sensitive notification) is determined based on the LPSI context information stored by the first memory 210 and based on the metadata representing the first gathered data.

In some embodiments, some first gathered data may be determined to be high priority data regardless of LPSI context information. For example, audio/video data indicating that a gunshot occurred or any data indicating a "man-down" situation has occurred may be determined to be high priority data regardless of any local context information. Other examples of determining a priority level of the first gathered data (e.g., based on the metadata and the LPSI context information) are provided below.

As a first example, when the local context information indicates that the type of public safety incident is a fire and the metadata indicates that the first gathered data is from an air quality sensor configured to detect caustic vapors or flammable gas from a particular chemical agent, the first electronic processor 205 determines that processing the first gathered data is a high priority (e.g., because of the potential danger for an explosion when flammable gas is near a fire). As a second example, when the local context information indicates that there is low visibility (e.g., due to heavy smoke as detected by an air quality sensor, due to lack of light as detected by a photosensor, or the like) and the metadata indicates that the first gathered data is image data without audio data, the first electronic processor 205 determines that processing the first gathered data is not a high priority (e.g., image data processing is unlikely to result in useful information due to poor visibility). In some embodiments, the first electronic processor 205 determines that processing the first gathered data in this second example is a low priority. As an alternative to the second example, when the metadata indicates that the camera used to gather the image data is a night vision camera, an infrared camera, or the like, the first electronic processor 205 may determine that processing the first gathered data is a medium priority because the data has a higher chance of being discernible than if the camera is a standard camera without night vision or infrared capabilities. In each of the preceding examples, the appropriate first gathered data set and affiliated local context information internal to an individual UE device 105 may be communicated as locally prioritized to the cloud-based electronic computing device 120 whereupon additional processing may transpire which encompasses gathered data, metadata, GPSI context information, and LPSI context information that may be shared by other UE devices 105. After additional processing by electronic computing device 120, a new prioritization level may be determined for some portion of the first gathered data set, and the updated prioritization may subsequently be communicated back to the originating UE device 105 from the computing device 120 through 5G/LTE base station 125. In this way, the individual UE prioritization metric for a first data set may be adjusted and the method of weighting a prioritization that is used by the first electronic processor 205 of the UE device 105 may also be dynamically adjusted based on computing device's 120 re-prioritization so as to accommodate an expanded understanding of the incident, without encumbering the UE device 105 with additional processing or potential exposure to incident threats that may occur due to local processing of less important/useful/relevant data compared to potentially more important/useful/relevant data.

As a third example, the metadata may indicate that the first gathered data is video data, but the local context information may not include any specific information that indicates whether analysis of video data will be particularly useful during the public safety incident (e.g., during a routine security check of building). Accordingly, the first electronic processor 205 determines that processing the first gathered data is not a high priority and is instead, for example, a medium priority. As a fourth example, the metadata may indicate that the first gathered data is from an air quality sensor configured to detect caustic vapors or flammable gas of a particular chemical agent. However, the local context information may indicate that the public safety incident is a routine security check of a building and that a fire is not currently occurring at the building. Accordingly, the first electronic processor 205 determines that processing the first gathered data is not a high priority and is instead, for example, a medium priority.

In some embodiments, the first electronic processor 205 is configured to use prioritization metrics stored in the first memory 210 to determine a priority of processing/analyzing the first gathered data. The prioritization metrics may be based on any of the information included in the local context information and/or in the metadata representing the first gathered data, as well as UE device 105 self-diagnostics (e.g., data packet size of the first gathered data, battery life of the first UE device 105, availability and latency of the CEC device 120, data format and correlation of the first gathered data, estimated usefulness of the processing of the first gathered data, priority of potential notifications that could be provided based on the processing of the first gathered data, and/or the like). For example, first gathered data with a large data packet size may tend to indicate that the first gathered data should not be processed by the first electronic processor 205 so as to avoid using limited power and processing capabilities of the first UE device 105. As another example, low battery life of the first UE device 105 may tend to indicate that the first gathered data should not be processed by the first electronic processor 205 so as to avoid further consuming power from the already low battery of the first UE device 105. As another example, the local context information indicating (i) that the CEC device 120 is functioning more slowly than usual or (ii) that the first UE device 105 does not have network coverage to communicate with the CEC device 120 may tend to indicate that the first gathered data should be processed by the first electronic processor 205 based on reduced latency or unavailability of the CEC device 120. Examples of data format of the first gathered data (e.g., type of data), estimated usefulness of the processing of the first gathered data, and priority of potential notifications that could be provided based on the processing of the first gathered data have been previously provided herein with respect to examples one through four. The prioritization metrics stored in the first memory 210 used to determine a priority of processing/analyzing the first gathered data may be reconfigurable, for example several prioritization metric profiles may be store in first memory 210 and one profile is summoned depending on the local and/or global context information available at a given point in time.

In some embodiments, each of the prioritization metrics may have a weight in an algorithm that is used to determine whether to immediately process the first gathered data by the first electronic processor 205. In some embodiments, the weights may be pre-programmed weights that are user-adjustable. In addition individual prioritization metrics and prioritization profiles stored in memory 210 may be dynamically adjusted by the CEC device 120 via wireless communication from base 5G/LTE base 125 based on expanded computations using data sets and contexts not available to the first electronic processor 205 of the UE device 105, where the expanded cloud based processing may indicate imminent threat assessments that warrant reprioritization prior to local awareness of the threat by the first electronic processor 205 within a UE device 105.

At block 525, in response to determining that the first gathered data should be processed by the first electronic processor 205 of the first UE device 105, the first electronic processor 205 processes the first gathered data to at least one of (i) provide an output with an output device of the first UE device 105 and (ii) transmit data to another local device that may be within the perimeter of the public safety incident (e.g., the IoT infrastructure (i.e., an IoT device 110) and/or one or more UE devices 105). In other words, the first electronic processor 205 locally processes the first gathered data without communicating the first gathered data or its corresponding metadata to the CEC device 120. The first electronic processor 205 may locally process the first gathered data to allow processed first gathered data to be used by one or more public safety personnel and/or devices 105, 110 located at the public safety incident more quickly than if the first gathered data or its corresponding metadata was communicated to the CEC device 120, for example, to further determine the priority/potential usefulness of the first gathered data. In other words, the first electronic processor 205 may immediately locally process first gathered data determined to be of high priority as explained previously herein such that the processed first gathered data may be utilized locally at the public safety incident.

Continuing the first example explained previously herein with respect to block 520, the first gathered data from the air quality sensor configured to detect flammable gas may be locally processed to determine whether a level of flammable gas of a particular chemical agent being detected by the sensor exceeds a predetermined threshold. In response to determining that the level of flammable gas exceeds the threshold, the first electronic processor 205 may provide a notification to the user of the UE device 105 (e.g., via the display 220, the speaker 230, or both) indicating that they should immediately leave the building. The first UE device 105 may additionally or alternatively transmit a similar notification to one or more other UE devices 105 and/or IoT devices 110. For example, the first UE device 105 may instruct an IoT device 110 that includes an audible alarm to generate sound indicating that the building should be evacuated. As is evident from this example, the time saved by immediately locally processing the first gathered data as opposed to transmitting the first gathered data or its metadata to the cloud may provide the additional time needed to increase safety for one or more public safety officers and/or members of the public.

In some embodiments, the first UE device 105 additionally or alternatively provides an instruction to another UE device 105 and/or an IoT device 110 to gather additional data based on the processed first gathered data. For example, the instruction is related to a prioritized public safety task such as identifying a location of a trespasser, identifying a location of a source of a fire, identifying noise being produced from a certain area, etc. As a more specific example, the instruction may instruct one or more devices 105, 110 to adjust the positioning of a camera to change a field of view to be in a direction where a trespasser is determined to be hiding. As other examples, the instruction may instruct one or more devices 105, 110 to engage in certain camera or audio filtering techniques based on the determined environment of the public safety incident, to control beam forming of an audio detection array of microphones to capture noise from a certain direction, to adjust the sensitivity of sensors such as smoke detectors, or the like.

In some embodiments, after executing block 525 to locally process the first gathered data at the first UE device 105, the first UE device 105 transmits the processed data and/or the gathered data to the CEC device 120 to add to the GPSI context information.

As an alternative to block 525, at block 530, in response to determining that the first gathered data should not be processed by the first electronic processor 205 of the first UE device 105, the first electronic processor 205 transmits, via the first network interface 215, at least one of the group consisting of metadata and the first gathered data to the CEC device 120. In other words, when the first gathered data is determined to include information that is not of high priority based on its metadata and the local context information, the first UE device 105 does not immediately process the first gathered data internally (i.e., locally) using the first electronic processor 205. Rather, the first UE device 105 transmits the first gathered data and/or its metadata to the CEC device 120 to allow the CEC device 120 to determine the priority/potential usefulness of the first gathered data as explained below with respect to FIG. 6. For example, because the CEC device 120 stores and updates GPSI context information that includes more information than the LPSI context information internal to the first UE device 105, the CEC device 120 may be able to better determine the priority level of the first gathered data and whether the first gathered data should be processed/analyzed as explained below with respect to FIG. 6. Similarly, the CEC device 120 may also be configured to determine whether the first UE device 105 should process the first gathered data or if the CEC device 120 should process the first gathered data as explained below with respect to FIG. 6.

The second, third, and fourth examples explained previously herein with respect to block 520 each illustrate situations where the first UE 105 may not immediately process the first gathered data and may instead transmit the first gathered data and/or its metadata to the CEC device 120.

In some embodiments, the first UE device 105 may receive and/or generate multiple types of gathered data simultaneously or nearly simultaneously. For example, the first UE device 105 may receive or generate multiple types of first gathered data from the above examples (e.g., air quality data and video data) simultaneously or nearly simultaneously. After determining that the multiple types of gathered data are not of a high priority and therefore need not be processed immediately by the first electronic processor 205 (at block 520), the first electronic processor 205 may transmit the gathered data and/or the metadata representing the gathered data to the CEC device 120 (at block 530). In some embodiments, the first electronic processor 205 may engage in weighted scaling to prioritize data packet transmissions to the CEC device 120 for each type of gathered data based on one or more prioritization metrics explained previously herein. In some embodiments, the weighted scaling is implemented according equation (1) to determine a weighting factor for transmission to the CEC device 120 ($\delta$) for each data packet associated with different gathered data.

$$\delta(\text{weight}) = \sum_{k=0}^{n} \alpha_k P_k^{n-k} \quad (1)$$

In this example, "$\alpha$" is a scaling factor of the k-th part of a data packet that may be informed by LPSI context information. In this example, "n" is a number of part of a data packet queued for transmission to the CEC device 120. It should be noted that the previous example outlining the weighted prioritization of data packet transmissions is not exhaustive and does not preclude the adoption of other prioritization strategies to facilitate the identification and commendation of certain information types to secondary (less important) information types.

In some embodiments, equation (1) assumes That for each "data packet" there are a number of parts of information, including size of the data, type of data, header information that may indicate characteristics of the data such location where the data was gathered, source of the data, time stamp of when the data was gathered, and/or the like. Many data packets may be generated by and/or received from many different sources or from one source over an extended time. Accordingly, the UE device 105 may use equation (1) or a similar equation to determine an order in which data packets should be transmitted to the CEC device 120 for further processing in accordance with other portions of this disclosure.

In some embodiments, $\delta$ (weight) is a cumulative priority weighting for a "data packet." A data packet may be comprised of "n" different parts, with each part given a predetermined associated weight $\alpha_k$, for example. Contents of a data packet may include, among other, the following example parts along with their respective weighting: data size, data type, time stamp, data source, and/or location. In some embodiments, data size weighting may be used because small data size may indicate higher probability for short transmission time and, accordingly, given higher weight for transmission. For example, data size weighting for a 10 megabyte packet may be $\alpha=0.2$, while data size weighting for a 100 kilobit may be $\alpha=0.9$. In some embodiments, data type weighting may be used such that data known to include more definitive information or that indicates higher probability for short transmission time is given a higher weight for transmission. For example, data type weighting for a video may be $\alpha=0.1$, while data type weighting for a still image may be $\alpha=0.6$. Continuing this example, data type weighting for an environment sensor may be $\alpha=0.9$. In some embodiments, time stamp weighting may be used such that more recent data is given a higher weight for transmission. For example, time stamp weighting for recent data may be $\alpha=0.9$, and as time elapses, a degrades. In some embodiments, data source weighting may be used such that data from different sources is given different weight for transmission. For example, data source weighting for data from an internal device of the UE device 105 (e.g., a sensor 240) may be $\alpha=0.9$, while data source weighting data from an IoT device 110 may have a varying weight $\alpha$ based on the type of IoT device 110 (e.g., based on what type of data is being produced by the IoT device 110). In some embodiments, location weighting may be used such that data from different locations is given different weight for transmission. For example, data generated in close proximity to the UE device 105 (e.g., within fifty feet) may be $\alpha=0.9$, while data generated greater than one mile away from the UE device 105 may be $\alpha=0.1$.

With reference to equation (1), the scale factor rating P=1 may be for "neutral" priority, varying up to 2 for higher priorities. As an example, 1<=P<=2, and in this context, P becomes a multiplier to increase the value of a part of a packet, which can be the adjusted by the CEC device 120 to scale a priority of the packets that are transmitted to the CEC device 120 from the UE devices 105. The CEC device 120 may also control $\alpha$. The value of controlling P over a may be that P may increase the entire data packet priority without effecting $\alpha$. In other words, the scale factor rating P may be different for each part of a data packet, but the same for a specific data set.

Again with reference to equation (1), the "n–k" power factor may be another component of the weighting factor where n may be the number of parts in a data packet, and k may be a specific part index. For this power factor to have meaning, there may be consideration given to positioning the most "important" parts into positions in the index k that are farther from n (i.e., k=0, 1 is index of more important parts than k=n). In other words, there is prioritization given to where the data is in the packet (i.e., index location), not just to the data itself.

In some embodiments, to find the total weighting of the entire data packet using equation (1), multiply $\alpha$ by the P raised to the (n–k) if data index location is used. Then sum up the individual factors to arrive at a particular data packet's priority rating. Then compare the priority rating of the data packet to other data packet weights to determine which packet(s) has the highest weighting for transmission and should be transmitted to the CEC device 120 first.

As noted previously herein, equation (1) is merely one example of determining which an order of data packets to send to the CEC device 120 when multiple data packets are waiting to be transmitted. Any part of equation (1) can be modified, discarded, or replaced in other embodiments.

As indicated in FIG. 5, after the performance of block 525 or 530, the method proceeds back to block 505 to begin a subsequent instance of the method 500 and continue gathering data at the scene/location of the public safety incident. Through performance of the method 500, the first UE device 105 may also receive additional or updated information from the command center 125 and/or the CEC device 120 to be saved in the first memory 210 as LPSI context information.

FIG. 6 is a flowchart of a method 600 of determining whether to process data gathered by the first UE device 105 (or by another device such as an IoT device 110) at the first UE device 105 or at the CEC device 120 when incident information, such as a data sets prioritization metrics, and/or context meta data, is received by the cloud based electronic computing device 120 and reprocessed in relation to a specific incident of interest at electronic processor 405, according to one example embodiment. In some embodiments, the method 600 is performed by the CEC device 120, and, specifically, the third electronic processor 405 that may have access to ancillary telemetry of unknown relevance or context to a specific public safety incident of interest. Processor 405 may be a single processor or a network of distributed processors within computing device 120, where processor(s) 405 may be tasked with complementary or divergent processing tasks such as may be needed to efficiently quantify an appropriate prioritization based on computations incorporating expanded data sets, metadata, and context information, and where said computations may be scaled in complexity based on the scope of the variables (i.e., data sets, metadata, context metrics, etc.) being utilized. As explained previously herein, the method 600 may be executed in conjunction with the related method 500 of FIG. 5 that is executed by the UE device 105. While both methods 500 and 600 relate to determining where/how to process data gathered by the first UE device 105 (or by another device such as an IoT device 110), the method 600 is explained from the perspective of the CEC device 120 while the method 500 was explained from the perspective of the UE device 105. In some embodiments, the method 600 is executed after/in response to performance of block 530 by the UE device 105. In other embodiments, the CEC device 120 may execute the method 600 independently of whether the UE device 105 performs the method 500.

An instance of the method 600 begins at block 605, where the third electronic processor 405 receives, via the third network interface 415, public safety incident information about a public safety incident from the public safety command center 125. In some embodiments, the receipt of public safety incident information by the CEC device 120 at block 605 is generally similar to the receipt of public safety incident information by the first UE device 105 at block 505 explained previously herein. However, the CEC device 120 may store more public safety incident information than the first UE device 105 as explained previously herein. The explanation with respect to block 505 also applies to block 605 and will not be repeated for the sake of brevity.

At block 610, the third electronic processor 405 of the cloud based electronic computing device 120 receives, via the third network interface 415, metadata representing first gathered data from a location of the public safety incident from a group consisting of at least one of the Internet-of-things infrastructure (i.e., one or more IoT devices 110) and/or at least one of the UE devices 105 (e.g., the first UE device 105). For example, the metadata is generated by the first UE device 105 (at block 515) and transmitted by the first UE device 105 (at block 530) as explained previously herein. In some embodiments, the CEC device 120 may also receive the first gathered data from the at least one of the Internet-of-things infrastructure (i.e., one or more IoT devices 110) and one or more UE devices 105 (e.g., the first UE device 105). The first gathered data may be received along with its corresponding metadata or it may be received at a later time, for example, in response to the CEC device providing an instruction to first UE device 105 or the IoT device 110 to transmit the first gathered data (e.g., see block 625).

At block 615, the third electronic processor 405 determines, based on the GPSI information and the metadata, whether to process the first gathered data by the first UE device 105 at the location of the public safety incident or by the third electronic processor 405 of the CEC device 120. In some embodiments, the determination made by the CEC device 120 at block 615 is generally similar to the determination made by the first UE device 105 at block 520 explained previously herein (e.g., using prioritization metrics and weighting factors). The explanation with respect to block 520 also applies to block 615 and, for the sake of brevity, will not be repeated in its entirety when explaining the details of block 615.

While blocks 520 and 615 are generally similar, at block 615, the third electronic processor 405 of the CEC device 120 derives its response to a particular data set based on GPSI context information available from multiple sources, instead of the more limited LPSI context information as is considered at block 520 for UE devices 105. In other words, because the CEC device 120 stores GPSI context information that includes information that may not be included in the LPSI context information of the first UE device 105, the CEC device 120 may be able to better determine the priority level of the first gathered data and whether the first gathered data should be processed/analyzed using specific algorithms, considerations and/or prioritizations. For example, the global context information may include information from numerous UE devices 105, IoT devices 110, and the command center 125 as explained previously herein. The GPSI context information may also be more up-to-date than LPSI context information stored on the first UE device 105, for example, if the GPSI context information was recently updated and the updated GPSI information was not yet transmitted to the first UE device 105.

Similar to the previous explanation with respect to block 520, at block 615, the third electronic processor 405 of computing device 120 may be configured to determine that the first gathered data should be processed by the first UE device 105 in response to determining that the metadata indicates that the first gathered data includes high priority information with respect to the public safety incident based on at least one of a type of the public safety incident, the location of the public safety incident, and an environment of the public safety incident. On the other hand, in some embodiments, the third electronic processor 405 is configured to determine that the first gathered data should be processed by the CEC device 120 in response to determining that the metadata indicates that the first gathered data includes medium or low priority information or in response to determining that the first gathered data is expected to be partially or completely redundant with previously stored data based on the metadata.

In addition to the examples of high priority information included in the metadata that were provided previously herein with respect to block 520, other examples are explained below and are based on the second, third, and fourth examples provided with respect to block 520.

Continuing the fourth example where a first UE device 105 may have determined at block 520 (FIG. 5) that detailed processing of local gathered air quality data was rated at medium priority because the public safety incident was a routine security check of a building and a fire was not currently detected by sensors at the building, the more up-to-date GPSI context information stored at the CEC device 120 may indicate that a "call-in" report of a fire at the building had been recently received. Accordingly, the third electronic processor 405 may determine that processing of the air quality data that may indicate the presence of flammable gas at the building is a high priority. Thus, the third electronic processor 405 may determine that the air quality data should be processed as soon as possible by the first UE device 105 (i.e., processed locally by the first UE device 105 rather than by the CEC device 120). The third electronic processor 405 may also determine that future gathered air quality data from the first UE device 105 should be processed locally by the first UE device 105 for the foreseeable future and may provide a corresponding instruction to the first UE device 105.

Continuing the third example where the first UE device 105 may have determined at block 520 (FIG. 5) that processing of gathered video data was rated at medium priority because there was no indication that the video data was particularly useful during the public safety incident (e.g., during a routine security check of building), recently updated GPSI context information stored at the CEC device 120 may indicate that a report of an public safety disturbance at the building has recently occurred. Accordingly, any video data from the building may be useful to analyze for suspicious activity. Thus, the third electronic processor 405 may determine that processing the video data is of high priority and may determine that the gathered video data and future gathered video data from the first UE device 105 should be processed locally by the first UE device 105 for the foreseeable future and may provide a corresponding instruction to the first UE device 105.

Alternatively, the third electronic processor 405 of the CEC device 120 may determine that processing of the video data is still of medium priority because processing the video data locally by the first UE device 105 may not provide a significant timing advantage or because the first UE device 105 may not have as robust video analytics capabilities as the CEC device 120. In this alternative example, the third electronic processor 405 may determine that the video data should be processed by the CEC device 120. In view of the public safety disturbance being reported at the building, the CEC device 120 may send an instruction to the UE device 105 to transmit all gathered video data for the foreseeable future to the CEC device 120 for processing/analysis. In other words, for the foreseeable future, the first UE device 105 would not send metadata corresponding to gathered video data to the CEC device 120 to determine whether the full gathered video data should be sent to the CEC device 120 for processing. Rather, based on the instruction from the CEC device 120, the first UE device 105 may provide gathered video data (e.g., stream video) directly to the CEC device 120 until the CEC device 120 instructs the first UE device 105 to stop doing so. The CEC device 120 may also send GPSI context information indicative of the reported public safety disturbance to the first UE device 105 to allow the first UE device 105 to update its LPSI context information.

In a further alternative scenario, the third electronic processor 405 of computing device 120 may determine that processing of the video data is of very high priority because processing the video data locally by the first UE device 105 may provide a significant timing advantage. However, the third electronic processor 405 may determine that, even if the video data were processed by first UE device 105, it is unlikely that the user of first UE device 105 would be able to employ time sensitive processed data in view of the GPSI context information informing the third electronic processor 405 that the ongoing public safety disturbance is presently requiring "all hands on deck" to physically contain the rapidly changing circumstance of the disturbance. Therefore, the CEC device 120 may send an instruction to the UE device 105 (and other UEs 105 proximate to the first UE 105) to transmit all gathered video data for the foreseeable future to the CEC device 120 for processing/analysis, thus allowing preservation of the battery capacity of the UE device 105 for critical voice communications during the course of the incident. Consequently, based on the instruction from the CEC device 120, the first UE device 105 (and other UEs 105 proximate to the first UE) may provide gathered video data (e.g., stream video) to the CEC device 120 until the CEC device 120 instructs the first UE device 105 to stop doing so. The CEC device 120 may also send GPSI context information indicative of the reported public safety disturbance to the first UE device 105 to allow the first UE device 105 to update its LPSI context information.

Continuing the second example with respect to block 520, the first UE device 105 determined that processing of gathered image data that does not include accompanying audio data was of low priority because the local context information indicated that there was low visibility when the image data was gathered. In some embodiments, the third electronic processor 405 may reach the same conclusion for the same reason. Accordingly, the third electronic processor 405 may determine that the CEC device 120 should process the image data (e.g., perform image analytics to attempt to recognize people, faces, etc.) to confirm that no useful information may be extracted from the processing.

Alternatively, in some embodiments, at block 615, the third electronic processor 405 determines that the first gathered data should not be processed by the first UE device 105, the CEC device 120, or any other device in the communication system 100. Rather, the third electronic processor 405 may determine that the first gathered data should be discarded without processing. As an alternative to the second example explained above, the third electronic processor 405 may determine not to process the image data gathered during low visibility because such data is unlikely to provide useful information. As another example, first gathered data may be discarded when it is expected to be redundant with previously stored data based on the metadata of the first gathered data. For example, when the metadata indicates that first gathered data is air quality data from a specific location of a building, but air quality data from another device 105, 110 located within a predetermined distance of the same specific location has recently been processed and stored by the CEC device 120, the first gathered data may be discarded without being processed.

Alternatively, if the public safety disturbance is of sufficient severity that its rating is of the highest priority, the third electronic processor 405 of CEC device 120 may instruct the UE device 105 to archive all audio data regardless of visibility or other contexts, either locally or in the cloud depending on memory storage capacity, so that post-mortem analysis of all information may be conducted from all sources regardless of the real-time prioritization so as to provide the best evidentiary context in reconstructing a public safety event.

In some embodiments, the third electronic processor 405 determines that the first gathered data should be processed by both the first UE device 105 and the CEC device 120. For example, the third electronic processor 405 may assign to itself and the first UE device 105 a portion of the first gathered data such that the first gathered data is processed more quickly than if any single one of the devices 105, 120 were to process the entirety of the first gathered data by itself. Such sharing of processing responsibilities may be particularly useful when the 5G/LTE network is bogged down with a large amount of other communication that may slow data upload speeds. Such sharing of processing may also be particularly useful when the CEC device 120 is already processing a large amount of other gathered data, which may cause the CEC device 120 to process the first gathered data more slowly. Alternatively, each of the CEC device 120 and the first UE device 105 may process the entirety of the first gathered data. For example, it may be beneficial for the first UE device 105 to immediately process potentially time-sensitive data to the best of its ability. However, because the CEC device 120 may have greater processing capabilities, it may also be beneficial for the CEC device 120 to re-process the first gathered data to potentially extract additional information that was not extractable by the first UE device 105 due the lesser processing capabilities of the first UE device 105. For example, some specific, time-sensitive video footage data processing may require physically large and power intensive Graphical Processing Units (GPUs), such as for instance the Nvidia Tesla P100 Data Center Accelerator, which can be hosted on large cloud-based servers but not on portable UE devices 105.

As indicated by the examples explained herein, in some embodiments, the third electronic processor 405 is additionally or alternatively configured to determine whether to process the first gathered data by the first UE device 105 or by the CEC device 120 based on at least one of a power level of a power supply of the first UE device 105, a processing capability of the first UE device 105, a type of data of the first gathered data, and an amount of the first gathered data.

At block 620, in response to determining that the first gathered data should be processed by the first UE device 105, the third electronic processor 405 sends a first instruction, via the third network interface 415, to the first UE device 105 instructing the first UE device 105 to process the first gathered data. In some embodiments, processing the first gathered data by the first UE device 105 (i.e., by the first electronic processor 205) results in the first UE device 105 performing an action. In some embodiments, block 620 is similar to block 525 of FIG. 5 explained previously herein and the details explained previously herein with respect to block 525 also apply to block 620. For example, the action performed by the first UE device 105 includes at least one of (i) providing an output with an output device of the first UE device 105 and (ii) transmitting data to one or more IoT devices 110 and/or other UE devices 105, and/or (iii) transmitting data computational results generated by UE device 105 to the electronic processor 405 of the CEC device 120.

In response to receiving the instruction from the CEC device 120, the first electronic processor 205 of the first UE device 105 may locally process the first gathered data to allow processed first gathered data to be used by one or more public safety personnel and/or devices 105, 110 located within the public safety incident perimeter more quickly than if the first gathered data was communicated to the CEC device 120 for processing.

Continuing the modified fourth example explained previously herein with respect to block 615, the third electronic processor 405 determined that the air quality data should be processed as soon as possible by the first UE device 105 because the more up-to-date global context information stored at the CEC device 120 indicates that a report of a fire at the building has been recently received. Accordingly, at block 620, the CEC device 120 may send an instruction to the UE device 105 to locally process/analyze the first gathered data (i.e., the air quality data) as well as additional air quality data gathered by the first UE device 105 for the foreseeable future. The CEC device 120 may also send GPSI context information indicative of the reported fire to the first UE device 105 to allow the first UE device 105 to update its LPSI context information.

When modified such that a fire is reported at the building of the fourth example explained above, the public safety incident of the fourth example is similar to that of the first example explained previously herein with respect to block 520. In some embodiments, the first gathered data from the air quality sensor is locally processed by the first UE device 105 to determine whether a level of flammable gas detected by the sensor exceeds a predetermined threshold. In response to determining that the level of flammable gas exceeds the threshold, the first electronic processor 205 may provide a notification to the user of the first UE device 105 (e.g., via the display 220, the speaker 230, or both) indicating that they should immediately leave the building. The first UE device 105 may additionally or alternatively transmit a similar notification to one or more other UE devices 105 and/or IoT devices 110. For example, the first UE device 105 may instruct an IoT device 110 that includes an audible alarm to generate sound indicating that the building should be evacuated. As another example, the first UE device 105 may instruct another nearby UE device 105 to provide a notification to a user indicating that they should immediately leave the building. In addition or as an alternative to the instruction, the first UE device 105 may provide the processed first gathered data to an IoT device 110 and/or another UE device 105 to allow these other devices to update their own LPSI context information. For example, the measured air quality may be saved by one of these other devices to update the LPSI context information. In some embodiments, the first UE device 105 is also configured to transmit the processed first gathered data to the CEC device 120 to allow the CEC device 120 to update the GPSI context information of the public safety incident. In other words, the third electronic processor 405 may be configured to receive, via the third network interface 415 and from the first UE device 105, processed data based on the processing of the first gathered data by the first UE device 105. The third electronic processor 405 may also be configured to use the processed data to add information to the GPSI context information or update information included in the GPSI context information. In some embodiments, the processed first gathered data may also be transmitted to the command center 125, from the first UE device 105 and/or the CEC device 120 in tandem or during separate transmissions.

As is evident from the above example, the time saved by immediately locally processing the first gathered data as opposed to transmitting the first gathered data to the cloud for processing/analysis may provide the additional time needed to increase safety for one or more public safety officers and/or members of the public. For example, locally processing the air quality data may allow for recognition of a gas leak and the potential for an explosion more quickly to allow for earlier evacuation of an area.

Although the processing of the first gathered data in the modified fourth example above includes comparing air quality data to a threshold, in some embodiments, other types of data processing/analysis may occur, for example, depending on other types of gathered data as explained herein. For example, when the first gathered data is image data (which may include a single image, a series of independent images, or multiple images in a sequential series (i.e., video data)), processing of the first gathered data by the first UE device 105 may include performing image analysis of the image data to extract information from the image data (e.g., facial recognition, recognition of a human in one or more frames of security camera footage, object recognition, etc.). The information extracted from the image data (e.g., a confidence interval that the image captures the target, image quality metrics, image priority, an identity of an object or person as a result of object or facial recognition, and the like) may be included in at least one of (i) the post-processed information included in the output provided via the output device of the first UE device 105 and (ii) telemetry information used by the first UE device 105 to determine the output provided via the output device of the first UE device 105. As an example of (i), the first UE device 105 may display images on the display 220 of security camera footage that include a human to allow a user of the first UE device 105 to attempt to identify the human and/or a direction in which the human was traveling. As an example of (ii), the first UE device 105 may use the recognition of a human in the processed first gathered data to provide an alert on the display 220 that indicates a human has been identified in security camera footage. Upon receiving the notification, if desired, the user may then search stored security camera footage at a time corresponding to when the human was identified in order to view footage of the human. Accordingly, the first UE device 105 may display the processed first gathered data itself (e.g., images) and/or information about or derived from the first gathered data (e.g., a notification regarding the gathered images).

As explained previously herein, in some embodiments, the third electronic processor 405 of the CEC device 120 is configured to transmit at least some of the GPSI context information to the first UE device 105 and other UE devices 105. In some embodiments, the GPSI context information (which becomes LPSI context information upon being stored by the UE devices) is configured to be used by the UE devices 105 to locally process future gathered data. For example, with reference to the fourth example explained with respect to block 620, the GPSI context information may indicate the predetermined threshold of air quality to be used by the first electronic processor 205 when processing the first gathered data. As another example, the global context information may include identifying information of a person that the first electronic processor 205 of the UE device 105 should attempt to identify when performing facial recognition of gathered image data. The CEC device 120 may also transmit algorithms or parameters thereof, and other related data (e.g., image analytics algorithms to be used for facial recognition, object recognition, etc.) to be used by the first electronic processor 205 when locally processing the first gathered data. Furthermore, the CEC device 120 may also transmit instructions to update the local prioritization profile to be used at the UE device 105.

If at block 615 the third electronic processor 405 of the CEC device 120 determines that the first gathered data should be processed by the CEC device 120, at block 625, in response thereto, the third electronic processor 405 may send a second instruction to the at least one of the Internet-of-things infrastructure and the one or more UE devices 105 (e.g., the first UE device 105) that was the source of the first gathered data set to instruct the device 105, 110 to transmit the first gathered data sets to the CEC device 120 via respective second network interfaces 315, 415. As explained previously herein, the first gathered data may have been gathered by the first UE device 105 using one or more of its own data gathering devices/sensors. Additionally or alternatively, the first gathered data may have been gathered by an IoT device 110 and is being locally stored by the IoT device 110 and/or the first UE device 105. In response to receiving the second instruction, the device 105, 110 where the first gathered data has been stored transmits the first gathered data to the CEC device 120.

At block 630, the third electronic processor 405 receives, via the third network interface 415, the first gathered data from the at least one of the IoT infrastructure and the one or more UE devices 105 (i.e., from the device 105, 110 where the first gathered data has been stored). As explained previously herein, for some instances of the method 600, the first gathered data is received by the CEC device 120 along with the metadata at block 610. Accordingly, in such instances, method 600 may skip over block 625 and/or 630 as may be indicated by instructions from the electronic processor 405 of the CEC processor 120, and may proceed directly to block 635.

At block 635, the third electronic processor 405 processes the first gathered data to add information to the public safety incident information or update information included in the public safety incident information (e.g., the public safety incident information received from the command center 125) to generate the GPSI context information with respect to the public safety incident. Accordingly, the GPSI context information may be updated as new data is gathered by the UE devices 105 and/or the IoT devices 110 located within the public safety incident perimeter. Such GPSI context information may be used by other UE devices 105 and/or used by the cloud-based electronic computing device 120 to determine whether UE devices 105 or the CEC device 120 should analyze future gathered data as explained herein.

At block 635, the processing of the first gathered data by the third electronic processor 405 may be similar to the processing of the first gathered data by the first electronic processor 205 explained previously herein with respect to block 620 of FIG. 6 and block 525 of FIG. 5. However, the third electronic processor 405 may have greater processing capabilities than the processing capabilities of the first UE device 105 as explained previously herein. In some embodiments, the first gathered data is image data. In such embodiments, the third electronic processor 405 may be configured to process the first gathered data by performing image analysis of the image data to extract the information added to the public safety incident information or the information used to update the public safety incident information from the image data. With reference to the example described above with respect to block 620, the extracted information may include a time and location at which a human or a specifically identified person (e.g., using facial recognition)

was recognized, for example, by analyzing security camera footage. The extracted information may also include a log of air quality values at different times for one or more locations at the public safety incident scene.

In some embodiments, the third electronic processor 405 is configured to transmit, via the third network interface 415 and in response to the third electronic processor 405 processing the first gathered data, a third instruction to the first UE device 105 instructing the first UE device 105 to perform an action similar to the actions described previously herein with respect to block 620 of FIG. 6 and block 525 of FIG. 5. For the sake of brevity, these actions will not be re-explained in their entirety but they apply to block 620 as well. As one example, the action performed by the first UE device 105 includes at least one of (i) providing an output with an output device of the first UE device 105 and (ii) transmitting data to another UE device 105 and/or IoT device 110 and/or (iii) transmitting data computational results (e.g., processed data) generated by UE device 105 and/or raw gathered data to the electronic processor 405 of the CEC device 120. The action may also be the first UE device 105 immediately transmitting future gathered data of a certain type to the CEC device 120 as explained previously herein regarding the alternative fourth example with respect to block 520 of FIG. 5. For example, the first UE device 105 may stream video data to the CEC device 120 for the foreseeable future without first transmitting metadata related to the video stream. In some embodiments, the third electronic processor 405 may transmit the third instruction directly over the 5G/LTE network to one or more IoT devices 110 to instruct the one or more IoT devices 110 to perform an action (e.g., sound an alarm).

In some embodiments, the third instruction instructs the first UE device 105, another UE device 105, and/or an IoT device 110 to gather additional data based on the updated GPSI context information (e.g., based on the processed first gathered data). For example, the third instruction is related to a prioritized public safety task such as identifying a location of a trespasser, identifying a location of a source of a fire, identifying noise being produced from a certain area, etc. As a more specific example, the third instruction may instruct one or more devices 105, 110 to adjust the positioning of a camera, or the focal point of a telescopic lens, so as to change a field of view to capture the location where a trespasser is determined to be hiding. As other examples, the third instruction may instruct one or more devices 105, 110 to engage in certain camera or audio filtering techniques based on the determined environment of the public safety incident, to control beam forming of an audio detection array of microphones to capture noise from a certain direction, to adjust the sensitivity of sensors such as smoke detectors, or the like.

As indicated in FIG. 6, after performing block 620 or 635, the method proceeds back to block 605 to begin a subsequent instance of the method 600 and continue receiving data from the command center 125 and/or from the first UE device 105, other UE devices 105, and/or IoT devices 110 at the scene/location of the public safety incident. Accordingly, the global context information may continue to be updated and may be used to determine whether future gathered data should be locally processed by UE devices 105 or remotely processed by the CEC device 120. For example, the third electronic processor 405 receives second metadata representing second gathered data (i.e., data gathered after the first gathered data) from the location of the public safety incident from another UE device 105 and/or IoT device 110. The third electronic processor 405 may determine, based on the GPSI context information and the second metadata, whether to process the second gathered data by the another UE device 105 and/or IoT device 110 or by the third electronic processor 405 of the CEC device 120.

FIG. 7 illustrates a flow diagram of a method 700 that shows various general steps taken by one or more UE devices 105 (e.g., the first UE device 105) and the CEC device 120 during performance of the methods 500 and 600 explained previously herein. While a particular order of processing steps, message receptions, and/or message transmissions is indicated in FIG. 7 as an example, timing and ordering of such steps, receptions, and transmissions may vary where appropriate without negating the purpose and advantages of the examples set forth in detail throughout the remainder of this disclosure.

The flow diagram of the method 700 is a simplified diagram intended to show the general flow of information between the first UE device 105 and the CEC device 120 according to an example embodiment. The flow diagram 700 may not necessarily indicate all actions performed by each device 105, 120 as explained previously herein. The general processes shown in the flow diagram 700 are explained in greater detail previously herein with respect to the methods shown in FIGS. 5-6. Accordingly, the processes shown in the flow diagram 700 of FIG. 7 will be explained only briefly below with references back to corresponding blocks of the methods 500 and 600 of FIGS. 5-6.

In FIG. 7, the dashed lines represent communication between devices of the communication system 100 while the solid lines indicate movement from one processing step to another step by a certain device 105, 120.

An instance of the device portion of the method 700 begins at block 705, where the first UE device 105 receives at least some global context information from the CEC device 120 and/or the command center 125 (see FIG. 1) which is similar to block 505 of FIG. 5. At block 710, the first UE device 105 polls one or more IoT devices 110 within communication range for sensor data. At block 715, the UE device receives sensor data from the one or more IoT devices 110. Blocks 710 and 715 may be performed during block 510 of FIG. 5 and in a similar manner as explained previously herein with respect to block 510 of FIG. 5. In some embodiments, the first UE device 105 may not poll the IoT devices 110 at block 710. Rather, the IoT devices 110 may broadcast their identification and/or sensor information for receipt by the first UE device 105 without being polled to do so. At block 720, the first UE device 105 receives sensor data from its own sensors/data gathering devices. Block 720 may also be performed during block 510 of FIG. 5 and in a similar manner as explained previously herein with respect to block 510 of FIG. 5.

At block 725, the first UE device 105 extracts metadata from the sensor data gathered from its own sensors and/or from the IoT devices 110 (similar to block 515 of FIG. 5). At block 730, the first UE device 105 determines whether to wait for instructions from the CEC device 120 before processing/analyzing the sensor data (e.g., first gathered data) which is similar to block 520 of FIG. 5.

When the first UE device 105 determines that the sensor data should be immediately processed locally by the first UE device 105, at block 735, the first UE device 105 performs local processing of the sensor data (similar to block 525 of FIG. 5). At block 740, the UE device 105 develops a portion of its own LPSI context information based on the processing of the sensor data. Block 740 may also be performed during block 525 of FIG. 5 as explained in greater detail previously herein (e.g., comparing air quality data to a threshold to determine whether there is a gas leak). At block 745, the first UE device 105 may transmit the metadata representing the sensor data and/or the sensor data itself to the other UE devices 105 and/or to the CEC device 120. The first UE device 105 may also transmit processed sensor data (i.e., processed first gathered data) to the other UE devices 105 and/or to the CEC device 120 (e.g., to indicate that the air quality data indicates the presence of a gas leak).

On the other hand, at block 730, when the first UE device 105 determines that the sensor data should not be immediately processed locally by the first UE device 105, the flow diagram 700 proceeds directly to block 745 to transmit the metadata representing the sensor data and/or the sensor data itself to the other UE devices 105 and/or to the CEC device 120 (similar to block 530 of FIG. 5). At block 747, other UE devices 105 may receive metadata, sensor data, and/or processed sensor data from the first UE device 105.

Turning to the functionality of the CEC device 120, an instance of the cloud-based portion of the method 700 begins at block 750, where the CEC device 120 receives public safety incident information from the command center 125 (similar to block 605 of FIG. 6). At block 755, the CEC device 120 develops GPSI context information using the public safety incident information and sends at least a portion of the GPSI context information to the first UE device 105, other UE devices 105, and/or IoT devices 110. At block 760, the CEC device 120 receives and processes metadata and/or sensor data from the UE devices(s) 105 and/or the IoT device(s) 110. Receipt of the metadata at block 760 may be similar receipt of the metadata at block 610 of FIG. 6. Processing of the metadata at block 760 may be similar to determining whether first gathered data/sensor data should be locally processed by the first UE device 105 or processed by the CEC device 120 at block 615 of FIG. 6. In situations where the CEC device 120 determines that the CEC device 120 should process the first gathered data, processing of the first gathered data/sensor data at block 760 may be similar to processing the first gathered data at block 625 of FIG. 6.

At block 765, the CEC device 120 determines an instruction and sends the instruction to the first UE device 105, other UE devices 105, and/or one or more IoT devices 110, which may be received by the first UE device 105, other UE devices 105, and/or one or more IoT devices 110 at block 735. In some embodiments, the instruction indicates that the first UE device 105 should locally process the first gathered data/sensor data (similar to block 620 of FIG. 6). In some embodiments, the instruction additionally or alternatively indicates that the first UE device 105 and/or an IoT device 110 should transmit the first gathered data/sensor data to the CEC device 120 for processing (similar to block 625 of FIG. 6). In some embodiments, the instruction additionally or alternatively indicates that the first UE device 105, another UE device 105, and/or one or more IoT devices 110 should perform an action (e.g., sound an alarm or provide a notification to a user).

As indicated by the dashed lines between block 770 and blocks 710, 715, and 760, at block 770, one or more IoT devices 110 may send sensor data gathered by the IoT devices 110 to the CEC device 120 and/or to the first UE device 105. In some embodiments, block 770 may be initiated by the CEC device 120 directly so as to trigger the transmission of one or more IoT devices 110 to send sensor data as may have been gathered by the IoT device 110. This action may the occur when the CEC device 120 seeks expanded localized data so as to more appropriately assess the priority of a recently received data set from UE device 105, or to better set GPSI context information relative to a particular public safety incident. Broadcast of the IoT data may be received by the local UE devices 105 and appropriately cataloged and stored in memory before a specific instruction is received by the UE device 105 to query the IoT devices 110. In this way, response time may be optimized for high priority data set gathering.

As indicated in FIG. 7, after performing block 745, the UE device portion of the flow diagram 700 proceeds back to block 705 to begin the subsequent instance of the UE device portion of the method 700. Similarly, after performing block 765, the CEC device portion of the flow diagram 700 proceeds back to block 750 to begin the subsequent instance of the CEC device portion of the method 700. In some embodiments, this subsequent repetition is similar to the subsequent repetition of the methods 500 and 600 explained above and allows the devices 105, 120 to accomplish the tasks described previously herein.

In some embodiments, the UE device portion of the method 700, beginning at block 705, and the CEC device portion of the method 700, beginning at block 750, may be performed asynchronously. For example, at a certain point in time, the several instances of the UE device portion of the method 700 beginning at block 705 may be performed while the CEC device portion of the method 700 may still be engaged in a single instance, and vice versa. Alternatively, in some embodiments, a new instance of the CEC device portion of the method 700 may be initiated for every completed instance of the UE device portion of the method 700, and vice versa.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A cloud-based electronic computing device comprising:
a network interface configured to communicate over a wireless communication network with at least one of an Internet-of-things (IoT) infrastructure and one or more User Equipment (UE) devices; and
an electronic processor coupled to the network interface and configured to
receive, via the network interface, public safety incident information about a public safety incident from a public safety command center,
receive, via the network interface, metadata representing first gathered data from a location of the public safety incident from the at least one of the IoT infrastructure and the one or more UE devices,
determine, based on the public safety incident information and the metadata, whether to process the first gathered data by a first UE device at the location of the public safety incident or by the electronic processor of the cloud-based electronic computing device,
in response to determining that the first gathered data should be processed by the first UE device, send a first instruction to the first UE device to process the first gathered data, wherein processing the first gathered data results in the first UE device performing an action, and
in response to determining that the first gathered data should be processed by the electronic processor of the cloud-based electronic computing device,
send a second instruction to the at least one of the IoT infrastructure and the one or more UE devices to transmit the first gathered data to the cloud-based electronic computing device,
receive, via the network interface, the first gathered data from the at least one of the IoT infrastructure and the one or more UE devices, and
process the first gathered data to add information to the public safety incident information or update information included in the public safety incident information to generate global public safety incident context information.

2. The cloud-based electronic computing device of claim 1, wherein the electronic processor is configured to:
receive, via the network interface, second metadata representing second gathered data from the location of the public safety incident from another of the at least one of the IoT infrastructure and the one or more UE devices, and
determine, based on the global public safety incident context information and the second metadata, whether to process the second gathered data by another of the at least one of the IoT infrastructure and the one or more UE devices or by the electronic processor of the cloud-based electronic computing device.

3. The cloud-based electronic computing device of claim 1, wherein the electronic processor is configured to determine that the first gathered data should be processed by the first UE device in response to determining that the metadata indicates that the first gathered data includes high priority information with respect to the public safety incident based on at least one of a group consisting of a type of the public safety incident, the location of the public safety incident, and an environment of the public safety incident.

4. The cloud-based electronic computing device of claim 1, wherein the electronic processor is configured to determine that the first gathered data should be processed by the electronic processor of the cloud-based electronic computing device in response to determining that at least one of a group consisting of (i) the metadata indicates that the first gathered data includes medium or low priority information with respect to the public safety incident based on at least one of the group consisting of a type of the public safety incident, the location of the public safety incident, and an environment of the public safety incident, and (ii) the first gathered data is expected to be redundant with previously stored data based on the metadata.

5. The cloud-based electronic computing device of claim 1, wherein the electronic processor is configured to determine whether to process the first gathered data by the first UE device or by the electronic processor of the cloud-based electronic computing device based on at least one of a group consisting of a power level of a power supply of the first UE device, a processing capability of the first UE device, a type of data of the first gathered data, and an amount of the first gathered data.

6. The cloud-based electronic computing device of claim 1, wherein the action performed by the first UE device includes at least one of a group consisting of (i) providing an output with an output device of the first UE device and (ii) transmitting data to another of the at least one of the IoT infrastructure and the one or more UE devices.

7. The cloud-based electronic computing device of claim 6, wherein the first gathered data includes image data;
wherein the electronic processor is configured to process the first gathered data by performing image analysis of the image data to extract the information added to the public safety incident information or the information used to update the public safety incident information from the image data; and
wherein processing of the first gathered data by the first UE device includes performing image analysis of the image data to extract information from the image data, the information extracted from the image data including at least one of a group consisting of (i) information included in the output provided via the output device of the first UE device and (ii) information used by the first UE device to determine the output provided via the output device of the first UE device.

8. The cloud-based electronic computing device of claim 1, wherein the electronic processor is configured to:
receive, via the network interface and from the first UE device, processed data based on the processing of the first gathered data by the first UE device; and
use the processed data to add information to the global public safety incident context information or update information included in the global public safety incident context information.

9. The cloud-based electronic computing device of claim 1, wherein the electronic processor is configured to transmit, via the network interface, at least some of the global public safety incident context information to at least one of a group consisting of the first UE device and a second UE device, wherein the global public safety incident context information is configured to be used by the at least one of the group consisting of the first UE device and the second UE device to locally process future gathered data.

10. The cloud-based electronic computing device of claim 1, wherein the electronic processor is configured to transmit, via the network interface and in response to the electronic processor processing the first gathered data, a third instruction to the first UE device instructing the first UE device to perform a second action.

11. The cloud-based electronic computing device of claim 1, wherein the electronic processor is configured to transmit, via the network interface, a third instruction to at least one of a group consisting of the first UE device and another of the at least one of the IoT infrastructure and the one or more UE devices, wherein the third instruction instructs the at least one of the group consisting of the first UE device and another of the at least one of the IoT infrastructure and the one or more UE devices to gather additional data based on the global public safety incident context information.

12. The cloud-based electronic computing device of claim 1, wherein the electronic processor is configured to determine that the first gathered data should be processed by the electronic processor of the first UE device in response to determining that the metadata indicates that the first gathered data includes high priority information with respect to the public safety incident based on at least one of the group consisting of a type of the public safety incident, the location of the public safety incident, and an environment of the public safety incident.

13. A method for determining whether to process data at a first User Equipment (UE) device or at a cloud-based electronic computing device, the method comprising:
receiving, with an electronic processor of the cloud-based electronic computing device and via a network interface of the cloud-based electronic computing device, public safety incident information about a public safety incident from a public safety command center;
receiving, with the electronic processor and via the network interface, metadata representing first gathered data from a location of the public safety incident from the at least one of an IoT infrastructure and one or more UE devices;
determining, with the electronic processor and based on the public safety incident information and the metadata, whether to process the first gathered data by a first UE device at the location of the public safety incident or by the electronic processor of the cloud-based electronic computing device;
in response to determining that the first gathered data should be processed by the first UE device, sending, with the electronic processor and via the network interface, a first instruction to the first UE device to process the first gathered data, wherein processing the first gathered data results in the first UE device performing an action; and
in response to determining that the first gathered data should be processed by the electronic processor of the cloud-based electronic computing device,
sending, with the electronic processor and via the network interface, a second instruction to the at least one of the IoT infrastructure and the one or more UE devices to transmit the first gathered data to the cloud-based electronic computing device,
receiving, with the electronic processor and via the network interface, the first gathered data from the at least one of the IoT infrastructure and the one or more UE devices, and
processing, with the electronic processor, the first gathered data to add information to the public safety incident information or update information included in the public safety incident information to generate global public safety incident context information.

14. The method of claim 13, wherein determining that the first gathered data should be processed by the first UE device includes determining that the first gathered data should be processed by the first UE device in response to determining that the metadata indicates that the first gathered data includes high priority information with respect to the public safety incident based on at least one of a group consisting of a type of the public safety incident, the location of the public safety incident, and an environment of the public safety incident.

15. The method of claim 13, wherein determining that the first gathered data should be processed by the electronic processor of the cloud-based electronic computing device includes determining that the first gathered data should be processed by the electronic processor of the cloud-based electronic computing device in response to determining that at least one of a group consisting of (i) the metadata indicates that the first gathered data includes medium or low priority information with respect to the public safety incident based on at least one of the group consisting of a type of the public safety incident, the location of the public safety incident, and an environment of the public safety incident, and (ii) the first gathered data is expected to be redundant with previously stored data based on the metadata.

16. The method of claim 13, wherein the action performed by the first UE device includes at least one of a group consisting of (i) providing an output with an output device of the first UE device and (ii) transmitting data to another of the at least one of the IoT infrastructure and the one or more UE devices.

17. The method of claim 13, further comprising transmitting, with the electronic processor and via the network interface, at least some of the global public safety incident context information to at least one of a group consisting of the first UE device and a second UE device, wherein the global public safety incident context information is configured to be used by the at least one of the group consisting of the first UE device and the second UE device to locally process future gathered data.

18. The method of claim 13, further comprising in response to the electronic processor processing the first gathered data, transmitting, with the electronic processor and via the network interface, a third instruction to the first UE device instructing the first UE device to perform a second action.

19. The method of claim 13, further comprising transmitting, with the electronic processor and via the network interface, a third instruction to at least one of a group consisting of the first UE device and another of the at least one of the IoT infrastructure and the one or more UE devices, wherein the third instruction instructs the at least one of the group consisting of the first UE device and another of the at least one of the IoT infrastructure and the one or more UE devices to gather additional data based on the global public safety incident context information.

20. A first User Equipment (UE) device comprising:
an output device configured to provide an output to a user;
an input device configured to capture data;
a network interface configured to communicate over a wireless communication network with at least one of a cloud-based electronic computing device, an Internet-of-things (IoT) infrastructure, and one or more other UE devices; and
an electronic processor coupled to the output device, the input device, and to the network interface, the electronic processor configured to
receive, via the network interface, public safety incident information about a public safety incident from a public safety command center,
receive, from at least one of a group consisting of (i) the input device, (ii) the IoT infrastructure, and (iii) the one or more other UE devices, first gathered data from a location of the public safety incident,
generate metadata representing the first gathered data,
determine, based on the public safety incident information and the metadata, whether to process the first gathered data by the electronic processor of the first UE device,
in response to determining that the first gathered data should be processed by the electronic processor of the first UE device, process the first gathered data to at least one of a group consisting of (i) provide the output with the output device and (ii) transmit data, via the network interface to one or more of the at least one of the IoT infrastructure and the one or more other UE devices, and
in response to determining that the first gathered data should not be processed by the electronic processor of the first UE device, transmit, via the network interface, at least one of a group consisting of the metadata and the first gathered data to the cloud-based electronic computing device.

\* \* \* \* \*